United States Patent [19]

Nagano

[11] Patent Number: 5,581,851

[45] Date of Patent: Dec. 10, 1996

[54] DRAW OPERATING TYPE CLAMPING DEVICE

[75] Inventor: Kenji Nagano, Ibaragi, Japan

[73] Assignee: Kabushiki Kaisha Kenlock, Osaka-fu, Japan

[21] Appl. No.: 449,842

[22] Filed: May 24, 1995

[30] Foreign Application Priority Data

Jul. 21, 1994 [JP] Japan .................................. 6-191754

[51] Int. Cl.⁶ ................................................... B65D 63/02
[52] U.S. Cl. .................. 24/20 R; 24/20 CW; 24/20 EE; 24/23 EE
[58] Field of Search ............................... 24/20 R, 23 EE; 24/20 CW, 20 EE

[56] References Cited

U.S. PATENT DOCUMENTS

| | | |
|---|---|---|
| 4,492,004 | 1/1985 | Oetiker . |
| 4,914,788 | 4/1990 | Ojima . |
| 5,138,746 | 8/1992 | Ojima . |
| 5,283,931 | 2/1994 | Oetiker . |

Primary Examiner—James R. Brittain
Assistant Examiner—Stephen Vu
Attorney, Agent, or Firm—Nikaido Marmelstein Murray & Oram LLP

[57] ABSTRACT

A draw operating type clamping device wherein an elastic hump is outwardly bulged from an outer overlap portion of a clamp band to serve as a tension spring element. The device includes an elastic hump taken to be a boundary and at a position reverse to a locking location where the seizing tooth of the inner overlap portion and the fixed tooth of the outer overlap portion of the camp band seizingly engage each other, there are a preparatory seizing tooth outwardly bulged from the inner overlap portion and a preparatory fixed tooth inwardly bulged from the outer overlap portion, so that if a stretch deforming force exceeding the elastic limit should act on the elastic hump, the preparatory seizing tooth and preparatory fixed tooth are brought into seizure engagement with each other, thereby eliminating the danger of the clamp band being loosened.

3 Claims, 23 Drawing Sheets

DRAW OPERATING TYPE CLAMPING DEVICE

BACKGROUND OF THE INVENTION

I have previously proposed U.S. Pat. No. 5,307,541 relating to a so-called open type clamping device including a clamp band formed of metal strip material cut to a fixed length, the clamp band being wound in a circular ring for three-dimensionalization with its opposite ends overlapping each other, the bore diameter of the clamp band being artificially forcibly contracted by a draw operating type tool such as a pair of pliers, the opposite ends being then fixed together, thereby semipermanently fixing a part to be fixed, such as a fluid conveying hose for various fluids, dustproof bellows, shaft boot or the like, on the connecting circumferential surface of a mating part, such as a joint pipe, cock, or rotatable shaft.

In the case of this prior patent, whether in the basic embodiment or in modified embodiments, as is clear from the enlarged sectional views in FIGS. 9 and 28 of that patent, a prop key 23, 230 extends inwardly from the outer overlap portion 11b, 110b of a clamp band 11,110 while a receiving hole 14, 140 for the prop key 23, 230 is formed in the inner overlap portion 11a, 110a of the clamp band 11, 110, the arrangement being such that as soon as a disengaging force acts between a fixed tooth 22b, 220b and a seizing tooth 16a, 160a, the prop key 23, 230 quickly engages the opening edge of the receiving hole 14, 140, thereby preventing loosening or disengagement of the clamp band 11, 110.

However, as a result of repeated tests conducted under severe operating conditions to provide for commercial production, it has been found that since the prop key 23, 230 and the receiving hole 14, 140 therefor are interposed between a locked position where the fixed tooth 22b, 220b and seizing tooth 16a, 160a seizingly engage each other and a position where elastic humps 25 which are tension spring elements are bent up, overstretching or yielding of the elastic humps 25 under excessive load exceeding the elastic limit would lead to loosening, though not disengagement, of the clamp band 11,110; it is impossible for the prop key 23, 230 to prevent such loosening. That is, the prop key 23, 230 is practically nothing as it is incapable of preventing accidental loosening of the clamp band 11, 110. The reason is that the elastic humps 25 are bent up at a position closer to the location of the presence of the intermediate portion 11c, 110c of the clamp band 11, 110 where there is no overlap.

Further, in the aforesaid prior invention, one cut end of the inner overlap portion 11a, 110a of the clamp band 11, 110 is formed as a nose 12, 120 having a small fixed width W1, the nose 12, 120 being adapted to enter a nose receiving hole 21, 210 correspondingly formed in the outer overlap portion 11b, 110b during the bore diameter contracting operation on the clamp band 11, 110, with the result that there is no level difference produced in the surface of the clamp band 11, 110. However, since the nose 12, 120 is still in the form of a flat plate as a whole including its front end, it is still difficult for the nose to enter the nose receiving hole 21, 210 correctly and quickly, with the inner overlap portion 11a, 110a and outer overlap portion 11b, 110b of the clamp band 11, 110 tending to transversely deviate relative to each other.

Such positional deviation also makes it difficult for the fixed tooth 22b, 220b and seizing tooth 16a, 160a to seizingly engage each other correctly and quickly; therefore, there is a problem that the pilot function is inferior which is to lead the inner overlap portion 11a, 110a and outer overlap portion 11b, 110b of the clamp band 11, 110 to the correct overlap state.

SUMMARY OF THE INVENTION

Accordingly, the present invention has been accomplished to solve such problems while retaining the merits of the aforesaid prior invention.

More particularly, the invention, which is directed to a draw operating type clamping device having an elastic hump serving as a tension spring element in the unrestrained state as in the aforesaid prior invention, is intended, first, to provide an arrangement wherein with an elastic hump is positioned in a region where the inner and outer overlap portion of a clamp band and outwardly bulged from the outer overlap portion, and wherein with the hump taken to be a boundary and at a position reverse to a locking location where the seizing tooth of the inner overlap portion and the fixed tooth of the outer overlap portion seizingly engage each other, a portion of the middle of a first convex channel wall outwardly bulged from the inner overlap portion serves as a preparatory fixed tooth while, correspondingly thereto, a portion of the middle of a first concave channel wall reversely or inwardly bulged from the outer overlap portion serves as a preparatory seizing tooth, so that even if an excessive load exceeding the elastic limit should act on the elastic hump to stretch the latter to the yield point, the preparatory fixed tooth and preparatory seizing tooth are brought into seizure engagement with each other, thereby eliminating the danger of the clamp band being loosened.

In that case, as in the aforesaid prior invention, if a prop key and a receiving hole therefor are interposed between a locking location where the seizing tooth of the inner overlap portion and the fixed tooth of the outer overlap portion in the clamp band seizingly engage each other and the location where the elastic hump is provided, then the unlocking preventing function can be developed; however, even if the provision of such prop key is omitted, the situation is quite the same and the danger of the clamp band being loosened is prevented by the seizure engaging action of the preparatory fixed tooth and preparatory seizing tooth.

A second object of the present invention is to provide an arrangement wherein one cut end of the inner overlap portion in the clamp band is notched to form a nose of smaller width than the fixed width of the metal strip material and the front end of the the said nose is outwardly bulged by an amount substantially equal to the thickness of the metal strip material to form a convex pilot element, whereby the pilot element quickly enters the nose receiving hole in the outer overlap portion, preventing the inner and outer overlap portions from transversely deviating from each other, so that they are automatically maintained in the correct overlap state.

Other objects may become apparent from the detailed description of preferred embodiments to be given below.

DESCRIPTION OF THE PREFERRED EMBODIMENTS

Figure 1:
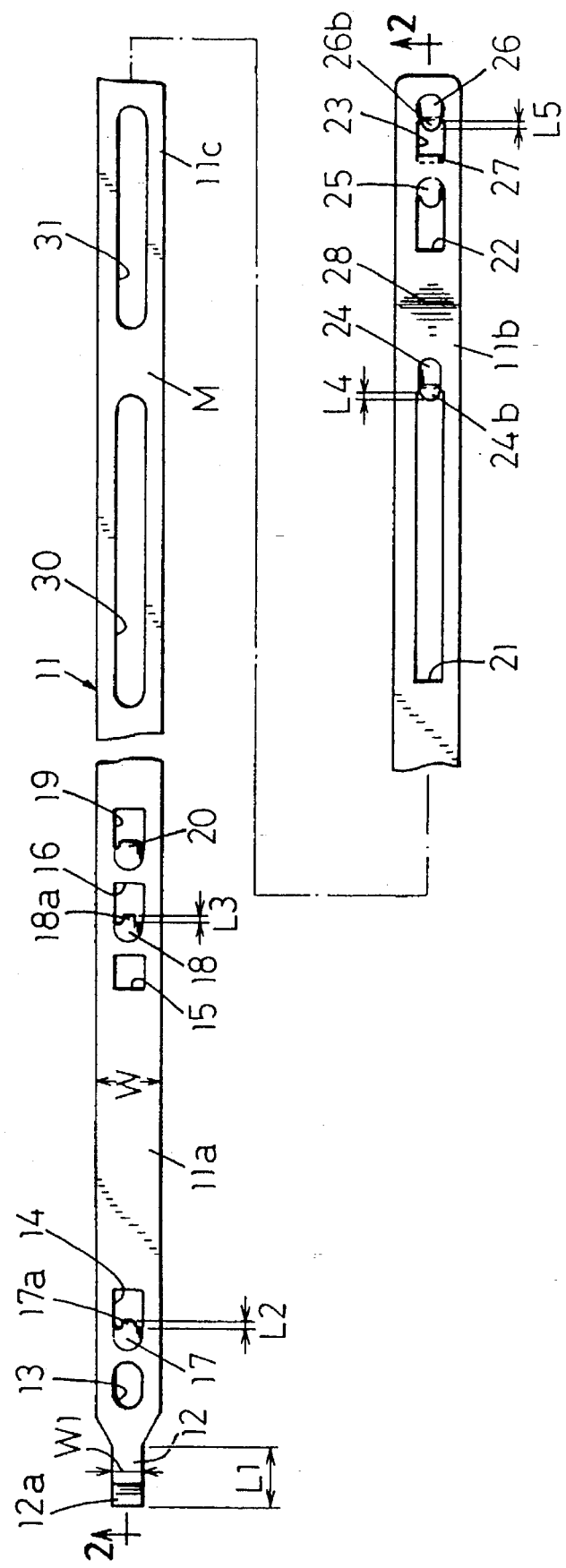
FIG. 1 is a fragmentary plan view showing the developed planar state of a clamping device according to the invention.
Figure 2:
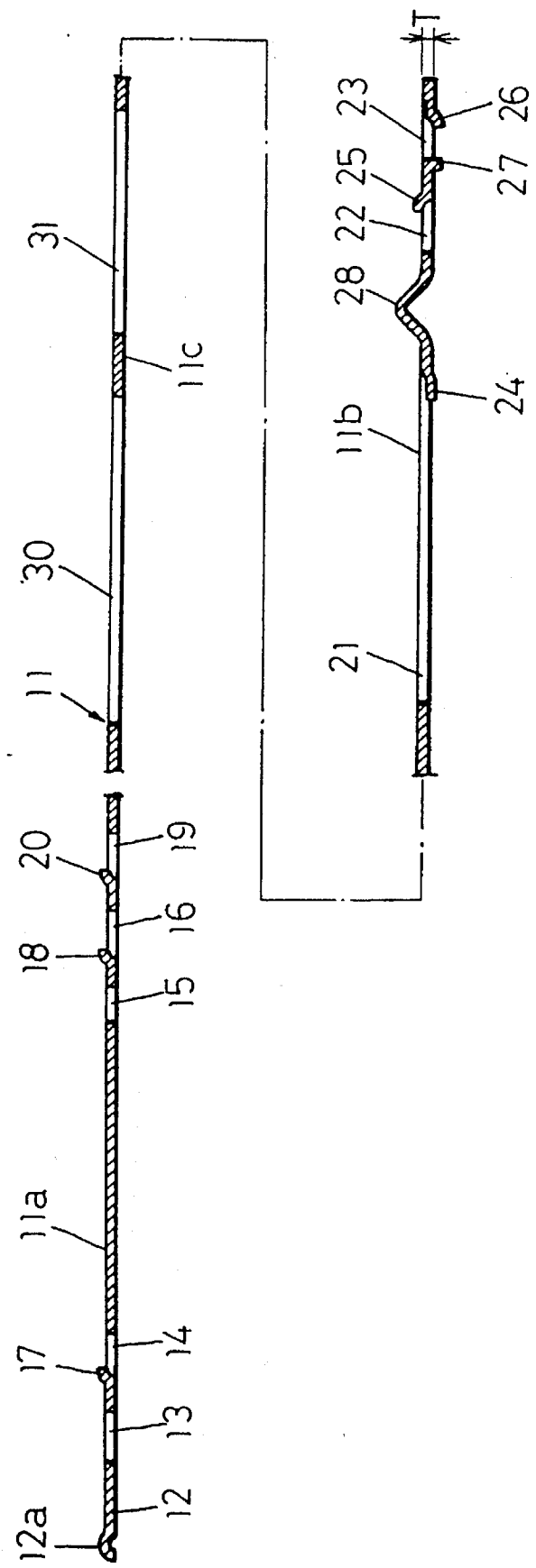
FIG. 2 is a sectional view taken along the line 2—2 in FIG. 1.

The arrangement of the present invention will now be described in detail with reference to the drawings. FIGS. 1 and 2 show the developed planar state (the material processing state) of a clamping device, and FIGS. 3 through 9 show a roll-bent three-dimensionalized product and its state of use. As a material for the clamping device, use is made of stainless steel (for example, SUS 301 or SUS304) having a fixed thickness T (e.g., about 0.7–1.0 mm) and a fixed width W (e.g., about 7–10 mm) or the like metal strip M, such long-sized material being cut into lengths having a fixed length L suited to the diameter of a part to be fixed 10, such as a dustproof bellows, axial boot or the like.

The numeral 11 denotes a clamp band made of such metal strip material M cut to a fixed length roll-bent for three-dimensionalization in a circular ring as seen in front and rear views, the clamp band directly serving to clamp the part 10. Roll-bent one end side overlaps the other end side of the clamp band by a fixed amount X. That is, they are in the overlap state in which one roll-bent end of the clamp band 11 forms an inner overlap portion 11a and the other roll-bent end forms an outer overlap portion 11b. The character 11c denotes an intermediate portion where no overlap takes place.

The clamp band 11 has, of course, the fixed width of the metal strip material M, but one cut end alone of the inner overlap portion 11a is cut to form a nose 12 having a fixed width W1 (e.g., about 2.5–3.0 mm) narrower than the fixed width W of the metal strip material M. The character L1 indicates the length of the nose 12. For example, it is about 7–10 mm.

In this case, the front end of the nose 12 is outwardly bulged by an amount approximately equal to the thickness T of the metal strip material M to form an upwardly curved pilot element 12a. Thus, receiving the pilot element 12a of the nose 12 in a common receiving hole in the outer overlap portion 11b to be later described makes it possible to bring the inner and outer overlap portions 11a and 11b of the clamp band 11 correctly and rapidly into their overlap relation without the danger of their transverse positional deviation.

The numerals 13, 14, 15, and 16 denote a roll-bending formation lock pin receiving hole, a first concave channel wall receiving hole, a prop key receiving hole and a second concave channel wall receiving hole disposed in the order mentioned in the inner overlap portion 11 as viewed from the nose 12 at one cut end toward the intermediate portion 11c, all these being distributed on the longitudinal centerline of the metal strip material M.

The roll-bending formation lock pin receiving hole 13 is adapted to receive a locking pin erected on the circumferential surface of the roll-bending forming mandrel roll to be later described and with the locking pin received to establish the locked state, the clamp band 11 is roll-bent in a circular ring form for three-dimensionalization by the rotation of the mandrel roll. To this end, it is disposed adjacent the bulged base end of said nose 12 and is oval or circular in plan view.

Further, the first concave channel wall receiving hole 14 is disposed in the vicinity of the locking pin receiving hole 13 and its opening edge adjacent the locking pin receiving hole 13 is formed as a first convex channel wall 17 which is outwardly bulged by an amount approximately equal to the thickness T of the metal strip material M by the bending-up operation on the metal strip material M. Furthermore, a portion of the middle of the first convex channel wall 17 extends by a fixed amount L2 (e.g., about 1.5 mm) toward the inside of the first concave channel wall receiving hole 14 to form a preparatory seizing tooth 17a for prevention of the loosening of the clamp band 11. It is arranged that if an excessive force exceeding the elastic limit should acts on an elastic hump to be later described, the preparatory seizing tooth 17a engages a preparatory fixed tooth to be later described, thereby holding the clamp band 11 in the non-loosened, locked state.

The prop key receiving hole 15 is a disposed relatively remote from the first concave channel wall receiving hole 14, but it is also disposed in the inner overlap portion 11a of the clamp band 11, having a quadrangular form as seen in plan view, and its opening edge adjacent the second concave channel wall receiving hole 16 is engageable with the prop key in the outer overlap portion 11b to be later described.

Further, the second concave channel wall receiving hole 16 is disposed in the vicinity of the prop key receiving hole 15 and its opening edge adjacent said prop key receiving hole 15, as in the case of the first convex channel wall 17, is formed with a second convex channel wall 18 which is outwardly bulged by an amount approximately equal to the thickness T of the metal strip material M by bending-up the metal strip material M.

Furthermore, a portion of the middle of the second convex channel wall 18 extends by a fixed amount L3 (e.g., about 1.5 mm) toward the inside of the second concave channel wall receiving hole 16 to form a fastening-purpose seizing tooth 18a adapted to engage the fixed tooth of he outer overlap portion 11b.

The numeral 19 denotes a first operating tool receiving hole disposed on the opposite side of the second concave channel wall receiving hole 16 to the prop key receiving hole 15, and formed in the intermediate portion 11c of the clamp band 11 where there is no overlap, adapted to receive an operating tool to be latter described.

In this case, the opening edge of the first operating tool receiving hole 19 adjacent the second concave channel wall receiving hole 16, as in the case of the first and second convex channel walls 17 and 18, is formed with a third convex channel wall 20 outwardly bulged by an amount approximately equal to the thickness T of the metal strip material M by bending up the strip material M.

The third convex channel wall 20 functions as an operating tool support reinforcing bead or rib to resist the drawing force developed by the operating tool to be later described; thus, the operating tool can be stably supported without slipping.

On the other hand, the outer overlap portion 11b of the clamp band 11 is formed with a common receiving hole 21 for receiving the nose 12 and first convex channel wall 17, a second operating tool receiving hole 22 and a receiving hole 23 for receiving the second convex channel wall 18, disposed in the order mentioned from the intermediate portion 11c toward the other cut end. It goes without saying that all these holes are distributed on the longitudinal centerline of the metal strip material M.

The common receiving hole 21 in the outer overlap portion 11b is wide open in the form of a considerably elongated quadrangle as seen in plan view for receiving both the nose 12 and the first convex channel wall 17 at the same time. Reception of the pilot element 12a of the nose 12 outwardly bulging from one cut end of the inner overlap portion 11a and the first convex channel wall 17 ensures absence of a level difference in the clamp working surface.

In this case, the front end of the nose 12 quickly advances into the common receiving hole 21 to serve as a pilot element 12a, with the result that there is no danger of the inner and outer overlap portions 11a and 11b being transversely deviated from each other; thus, the correct overlap state is attained.

The opening edge of said common receiving hole 21 adjacent the second operating tool receiving hole 22, is inwardly recessed by an amount substantially equal to the thickness T of the metal strip material M in that in the wound-up state of the clamp band 11 shown in FIGS. 3 through 9, the metal strip material M is reversely (inwardly) bent-up to serve as a first concave channel wall 24 opposed to the first convex channel wall 17 of the inner overlap portion 11a.

Whereas the first convex channel wall 17 of the inner overlap portion 11a is outwardly bulged, the first concave channel wall 24 of the outer overlap portion 11b is inwardly bulged.

Moreover, a portion of the middle of the first concave channel wall 24 continuously integrally extends by a fixed amount L4 (e.g., about 1.5 mm) toward the common receiving hole 21 to form a slack preventing preparatory fixed tooth 24b, the preparatory fixed tooth 24b being opposed to the preparatory seizing tooth 17a of the inner overlap portion 11a. That is, in the normal lock state in which the seizing tooth 18a of the inner overlap portion 11a and the fixed tooth of the outer overlap portion 11b to be later described have completely seizingly locked each other, the preparatory seizing tooth 17a and the preparatory fixed tooth 24b have not yet seizingly locked each other. It is only when excessive stretch deforming forces act an on elastic hump to be later described that they seizingly lock each other, thereby eliminating the danger of the clamp band 11 becoming loose. For this reason, the preparatory seizing tooth 17a and preparatory fixed tooth 24b are in positional relation with an elastic hump interposed therebetween, in association with the locking position between the seizing tooth 18a and fixed tooth.

Further, the second operating tool receiving hole 22 in the outer overlap portion 11b is symmetrically juxtaposed with the first operating tool receiving hole 19, and its opening edge adjacent the second convex channel wall receiving hole 23 is formed as a fourth convex channel wall 25 outwardly bulged by an amount substantially equal to the thickness T of the metal strip material M by bending-up the metal strip material M.

The fourth convex channel wall 25 of the outer overlap portion 11b, like the third convex channel wall 20 of the inner overlap portion 11a, serves as an operating tool supporting reinforcing bead or rib capable of resisting the draw operating force produced by the operating tool, ensuring stabilized locking of the operating tool.

Further, the opening edge of the second convex channel wall receiving hole 23 positioned at the other cut end of the clamp band 11 is inwardly recessed by an amount substantially equal to the thickness T of the metal strip material M in that, as in the case of the first concave channel wall 24, the metal strip material M is reversely (inwardly) bent-up to serve as a second concave channel wall 26 opposed to the second convex channel wall 18 of the inner overlap portion 11a.

Whereas the second convex channel wall 18 of the inner overlap portion 11a is outwardly bulged, the second concave channel wall 26 of the outer overlap portion 11b is inwardly bulged.

Moreover, a portion of the middle of the second concave channel wall 26 continuously integrally extends by a fixed amount L5 (e.g., about 1.5 mm) toward the inside of the second convex channel wall receiving 23 to form a fastening fixed tooth 26b, the fixed tooth 26b being adapted to seizingly engage the seizing tooth 18a of the inner overlap portion 11a.

Similarly, the opening edge of the second convex channel wall receiving hole 23 adjacent the second operating tool receiving hole 22 has a prop key 27 extending therefrom and continuously inwardly bent up for preventing separation of the clamp band 11.

If an accidental separating force acts between the seizing tooth 18a of the inner overlap portion 11a and the fixed tooth, the prop key 27 enters the prop key receiving hole 15 and quickly engages the opening edge of the receiving hole 15, propping the second convex channel wall 18 from behind, thereby holding the fixed tooth 26b and seizing tooth 18a in the joined state, preventing them from being disengaged.

Figure 8:
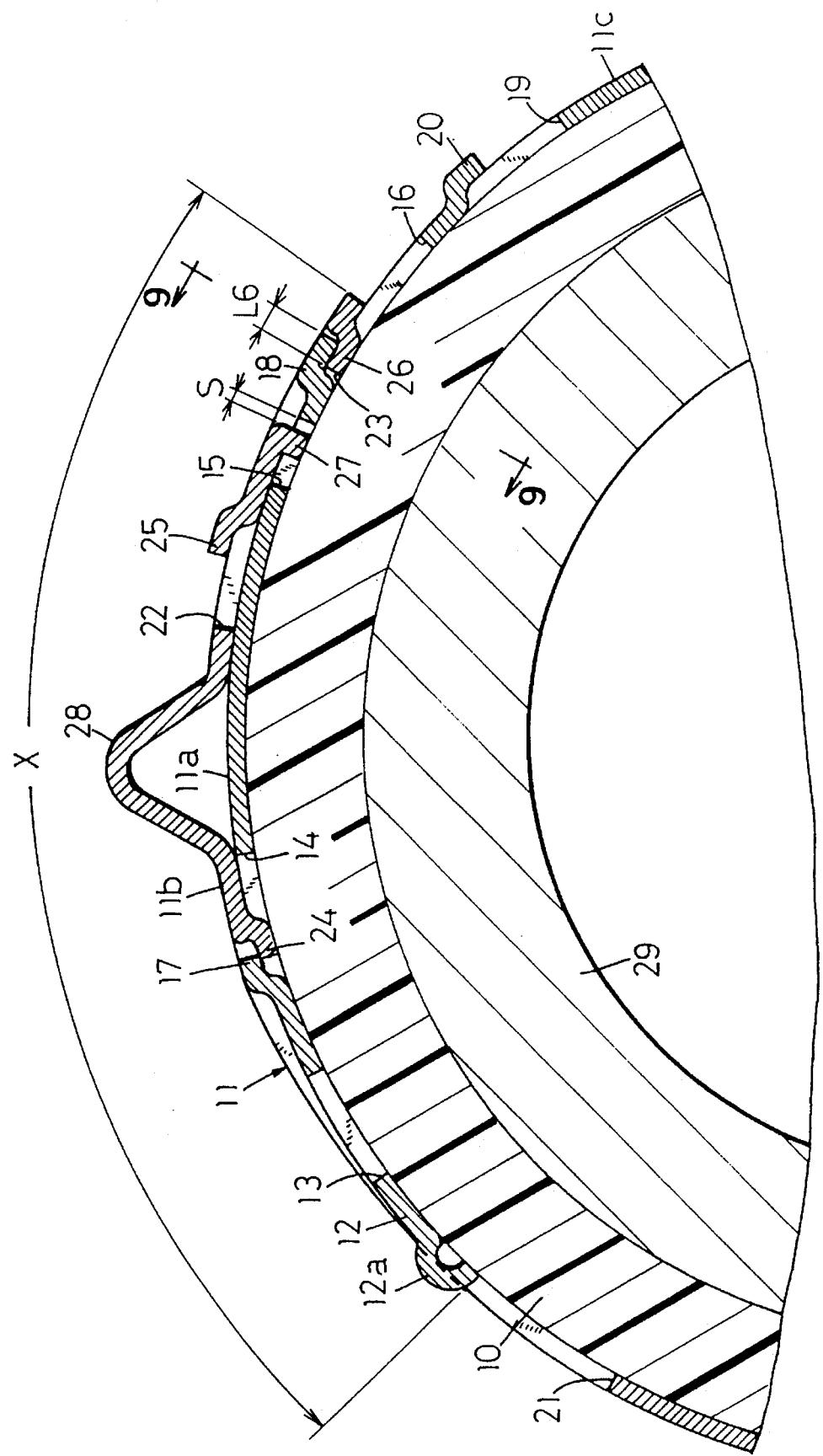
FIG. 8 a partial enlarged plan view of FIG. 7.
Figure 9:
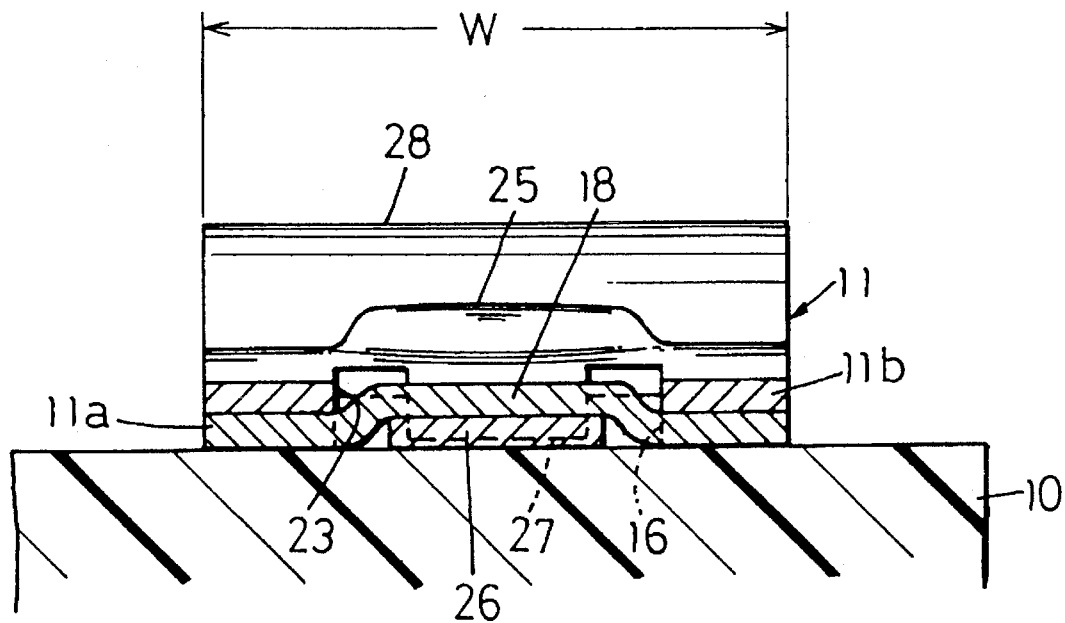
FIG. 9 is a sectional view taken along the line 9—9 in FIG. 8.

That is, in the normal joined state of the clamp band 11 in which the fixed tooth 26b and the seizing tooth 18a are in complete seizure engagement, as is clear from th enlarged view in FIG. 8, a fixed amount of clearance S is defined between the front bent-up end of the prop key 27 and the opening edge of the prop key receiving hole 15. When the prop key 27 is engaged with the opening edge of the prop key receiving hole 15, the fixed tooth 26b and the seizing tooth 18a still engage each other though slightly. This means that the amount of seizure engagement L6 is slightly greater than the clearance S.

The numeral 28 denotes an elastic hump interposed between the second operating tool receiving hole 22 and the common receiving hole 21, the elastic hump being outwardly bulged in inverted V-form, inverted W-form or other bent form as seen in front view. In the roll-bent three-dimensional state of the clamp band 11, the lower surface of the opening defined by the elastic hump 28 is closed by the inner overlap portion 11a.

That is, the elastic hump 28 is positioned in the overlap region of fixed size X of the clamp band 11 and between the first concave channel wall 24 provided with the preparatory fixed tooth 24b and the second concave channel wall 26 having the fixed tooth 26b, the elastic hump being outwardly bulged from the outer overlap portion 11b, thereby storing the spring force acting circumferentially of the clamp band 11.

Therefore, even if the part to be fixed 10 is a dustproof bellows, axial boot or the like made of synthetic resin material having a relatively high hardness, such as a Shore hardness of 90 or more, lacking in elasticity, or even if the part to be fixed 10 is a fluid conveying hose made of rubber material having elasticity with a Shore hardness of 60 or less and loses its elasticity with the lapse of time, the elastic hump 28 of the clamp band 11 elastically expands or contracts to exert its tension spring force to continue its firm contact with the circumferential surface of the part 10, thus maintaining the part 10 stably reliably tightened on the connecting circumferential surface of a desired mating device 29. Besides this, the elastic hump 28 is capable of absorbing vibrations and shocks applied to the part 10 during use.

During draw operation or use of the clamp band 11, even if an excessive load exceeding the elastic limit acts on the elastic hump 28 and its abnormal stretch deformation tends to loosen the clamp band 11, such loosening is prevented by the seizure engagement between the preparatory seizing tooth 17a and the preparatory fixed tooth 24b.

In this respect, as considered from the function of the spring element acting circumferentially of the clamp band 11, it could be contemplated to outwardly bulge the elastic hump 28 from the intermediate portion 11c where the clamp band 11 does not overlap. With such an arrangement, however, the opening lower surface of the elastic hump 28 would not be closed, so that the clamping surface of the clamp band 11 would not intimately contact the circumferential surface of the part 10, with a clearance formed therebetween, resulting in local weak points of clamping force, leading to an insufficient tightening effect. For this reason, when the elastic hump 28 is to be provided, it is necessary that it be bulged from the outer overlap portion 11b which overlaps the inner overlap portion 11a of the clamp band 11, as in the illustrated embodiment.

As for the bent shape of the elastic hump 28, an inverted V form or inverted W-form whose opening lower surface (inlet portion) gradually spreads as in the illustrated embodiment are preferable from the standpoint of preventing the nose 12 of the inner overlap portion 11a entering by mistake into the opening lower surface (inlet portion) of the elastic hump 28 during the roll bending of the clamp band 11 using a mandrel roll to be later described. However, so long as the pilot element 12a forming the front end of the nose 12 does not enter the same, the elastic hump may be made in omega form or other curved form in which the opening lower surface (inlet portion) is narrower than the innermost region, a case reverse to the illustrated embodiment.

The numerals 30 and 31 denote first and second relief holes for roll-bending forming operation formed in the intermediate portion 11c between the inner and outer overlap portions 11a and 11b of the clamp band 11, the relief holes being considerably elongated oval in plan view and disposed side by side on the longitudinal centerline of the metal strip material M.

The first and second relief holes 30 and 31 will be used when the clamp band 11 is roll-bent in annular form for three-dimensionalization, as will be later described in more detail. In addition, since the first and second relief holes 30 and 31 serve also for weight reduction, the number of such holes may be increased to more than 2 and they may be distributed in the intermediate portion of the clamp band 11.

Such a clamping device of the present invention can be mass-produced from stainless steel or other metal strip material M in the following manner.

Figure 10:
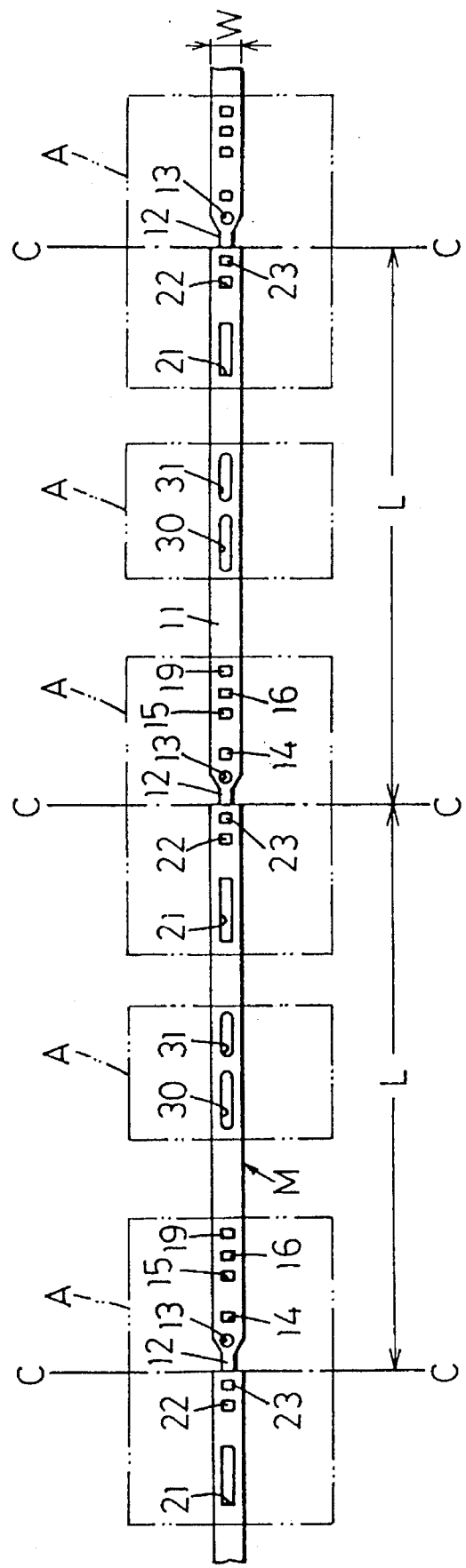
FIG. 10 is a plan view of a clamping device punched out of a metal strip material.
Figure 11:
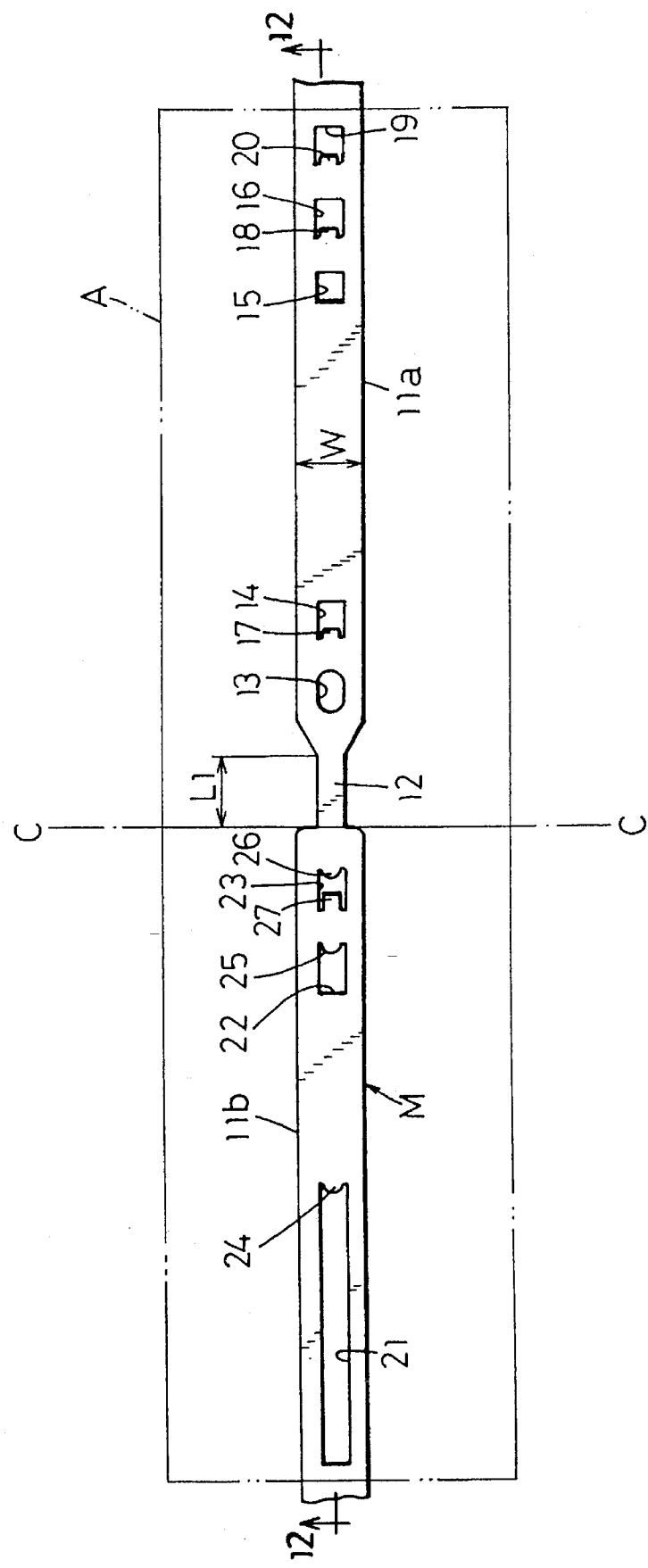
FIG. 11 is an enlarged plan view of a portion of FIG. 10.
Figure 12:
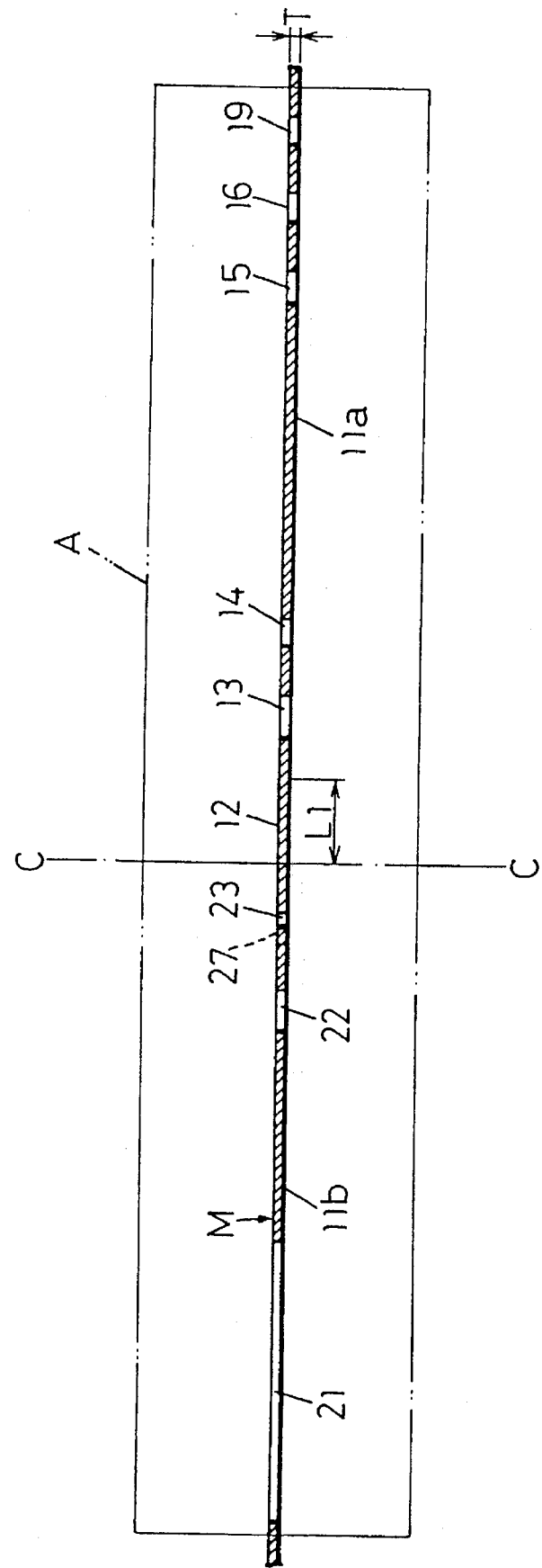
FIG. 12 is a sectional view taken along the line 12—12 in FIG. 11.

When the long-sized metal strip material M is automatically intermittently transferred in one direction along a transfer line, by the use of unillustrated punching dies, a notching operation to delimit the nose 12, the seizing teeth 17a and 18a, the fixed teeth 24b and 26b, and the prop key 27 and a punching operation to form the roll-bending formation lock pin receiving hole 13, the operating tool receiving holes 19 and 22, the concave channel wall receiving holes 14 and 16, the prop key receiving hole 15, the common receiving hole 21, the second convex channel wall receiving hole 23, and the roll-bending formation-purpose relief holes 30 and 31 are performed in the clamp band 11 at a stroke. The manner of operation is as shown in FIGS. 10 through 12.

Figure 13:
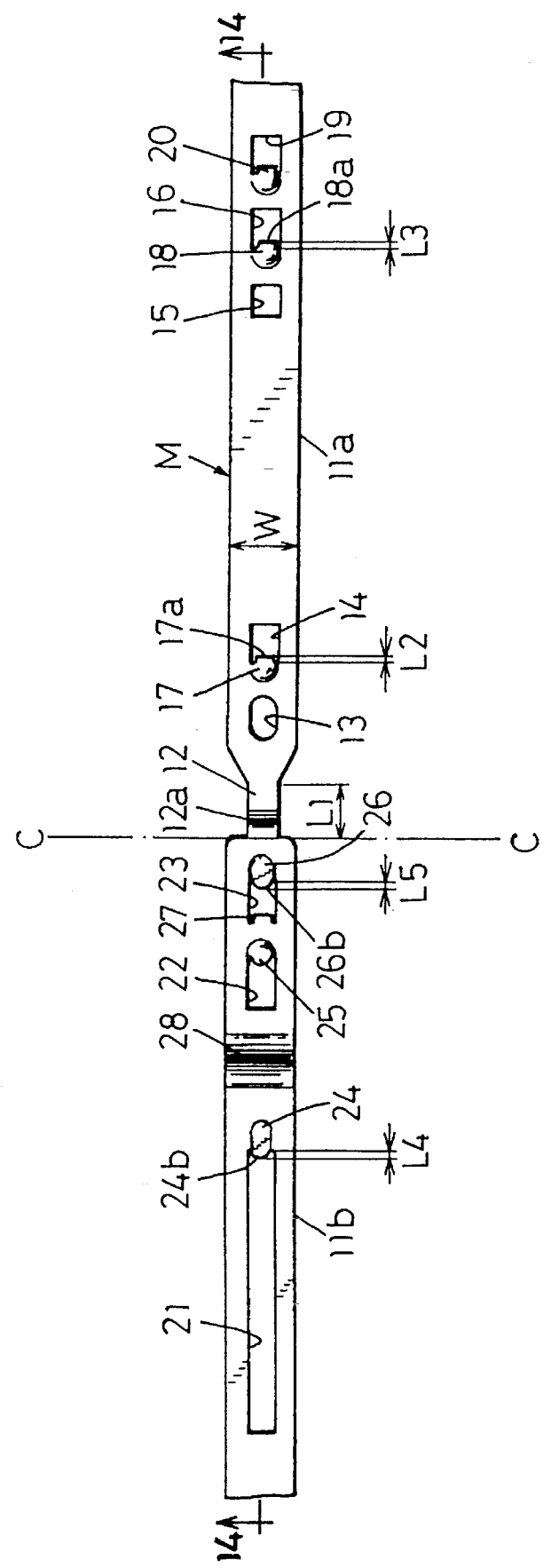
FIG. 13 is an enlarged plan view showing bent-up state corresponding to FIG. 11.
Figure 14:
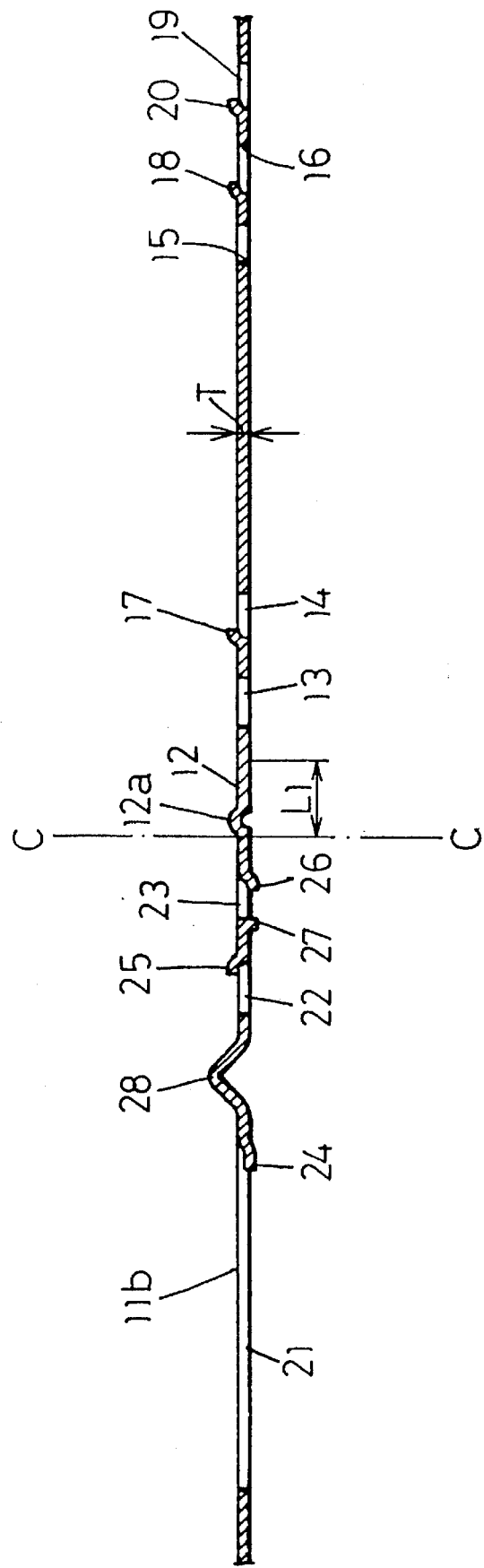
FIG. 14 is a sectional view taken along the line 14—14 in FIG. 13.
Figure 15:
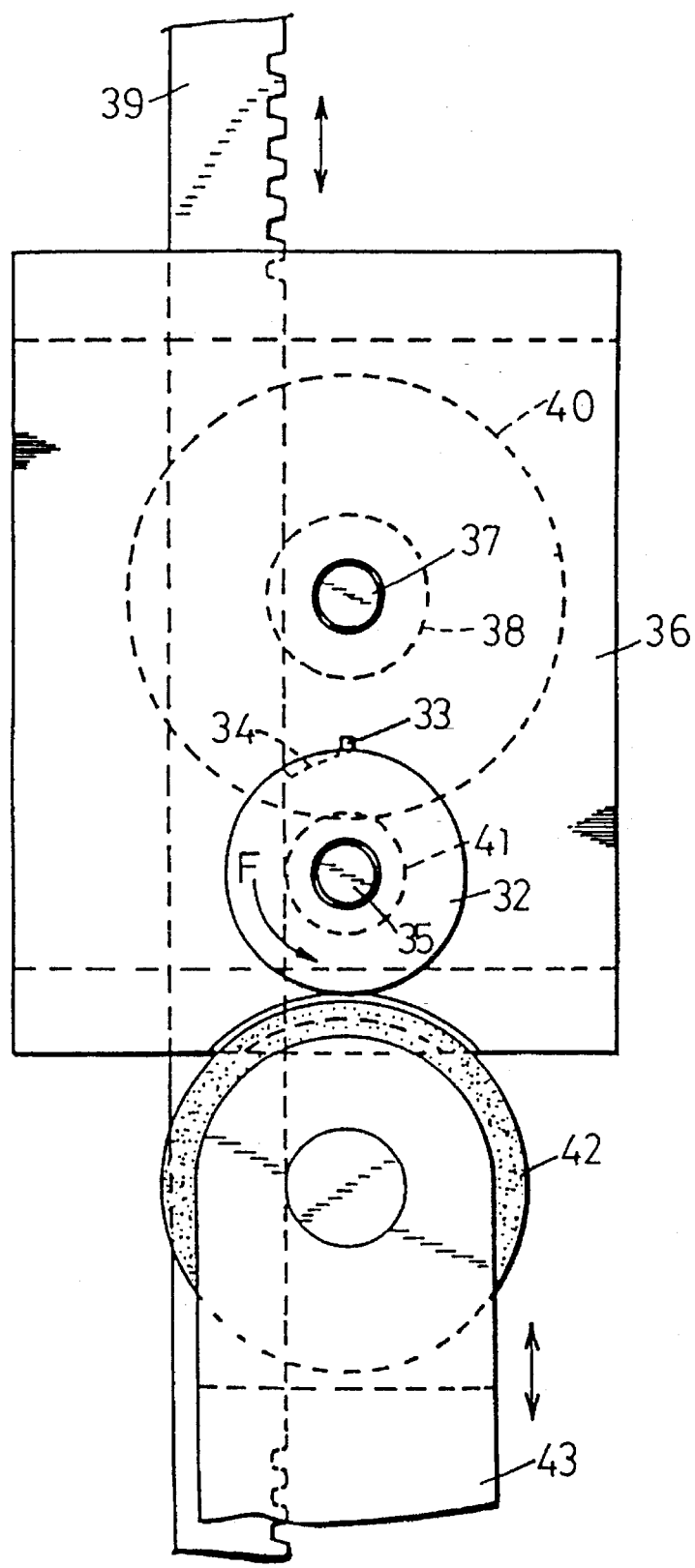
FIG. 15 is a front view showing a forming machine for roll-bending a clamping device.
Figure 16:
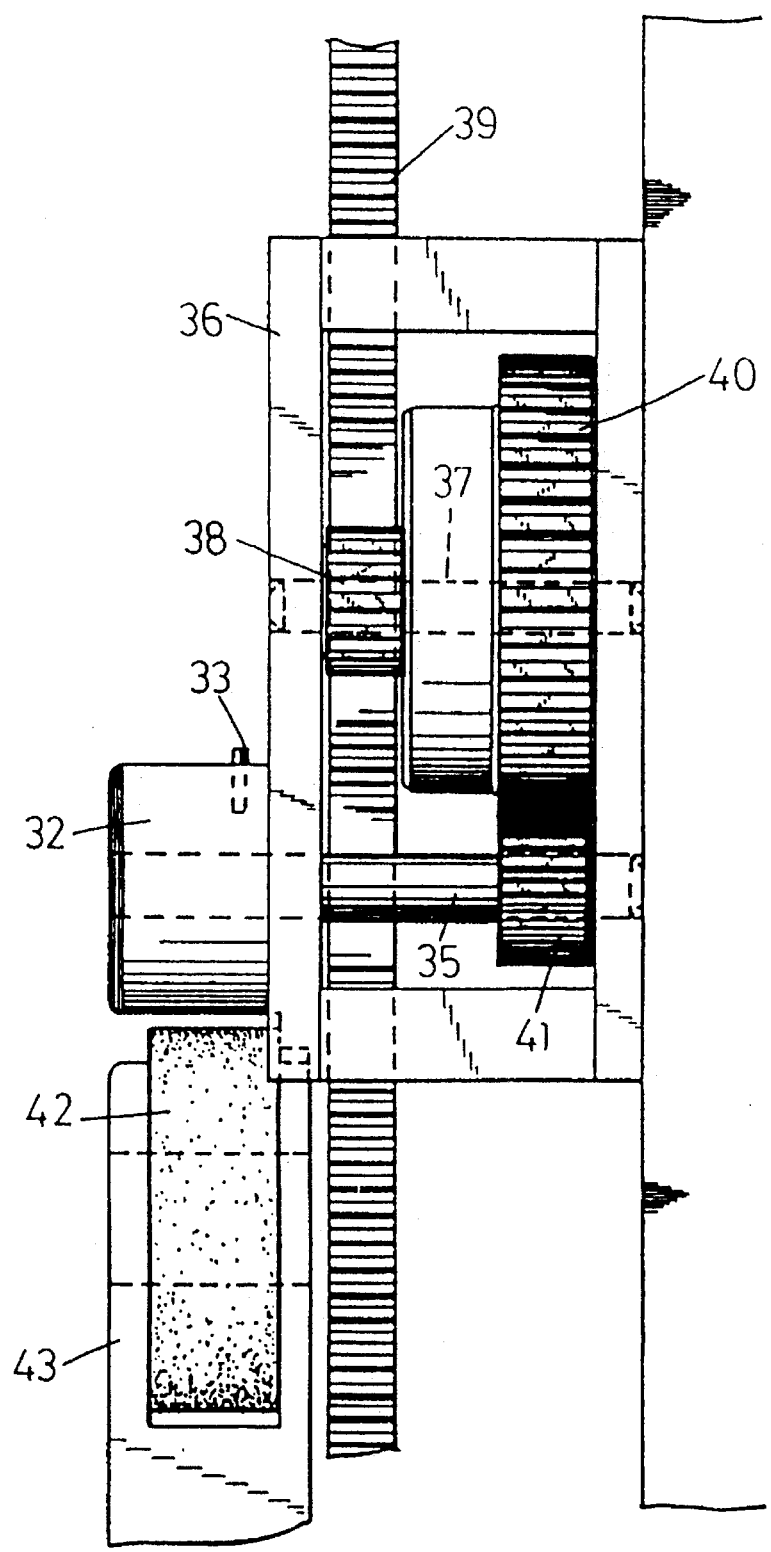
FIG. 16 is a side view of FIG. 15.
Figure 17:
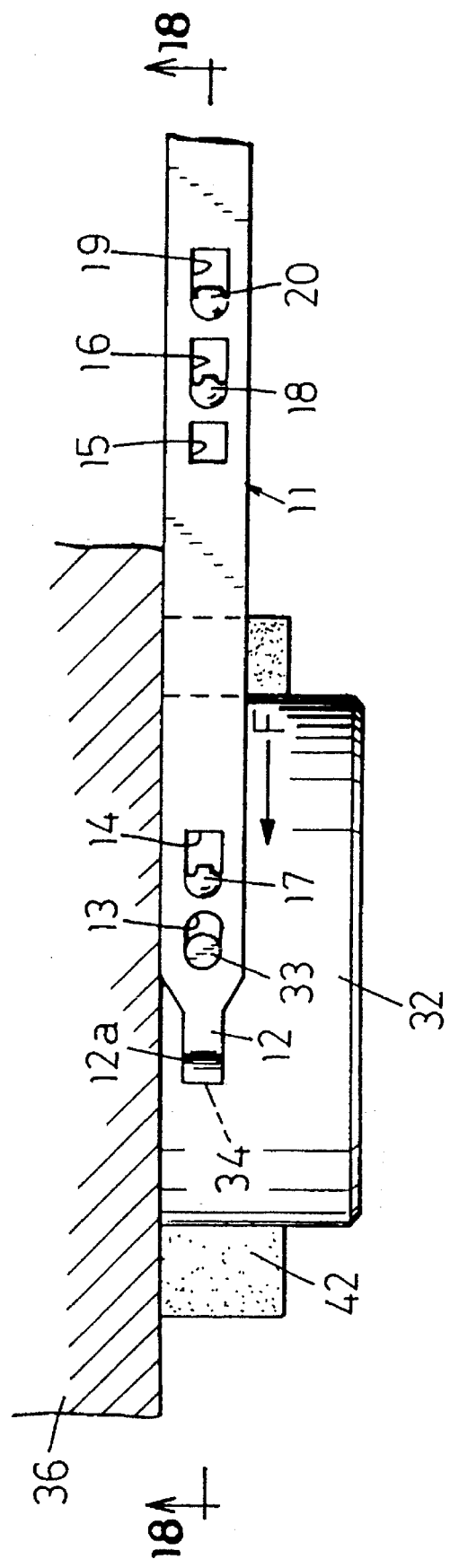
FIG. 17 is a plan view showing a clamping device attached to the mandrel roll of the forming machine.
Figure 18:
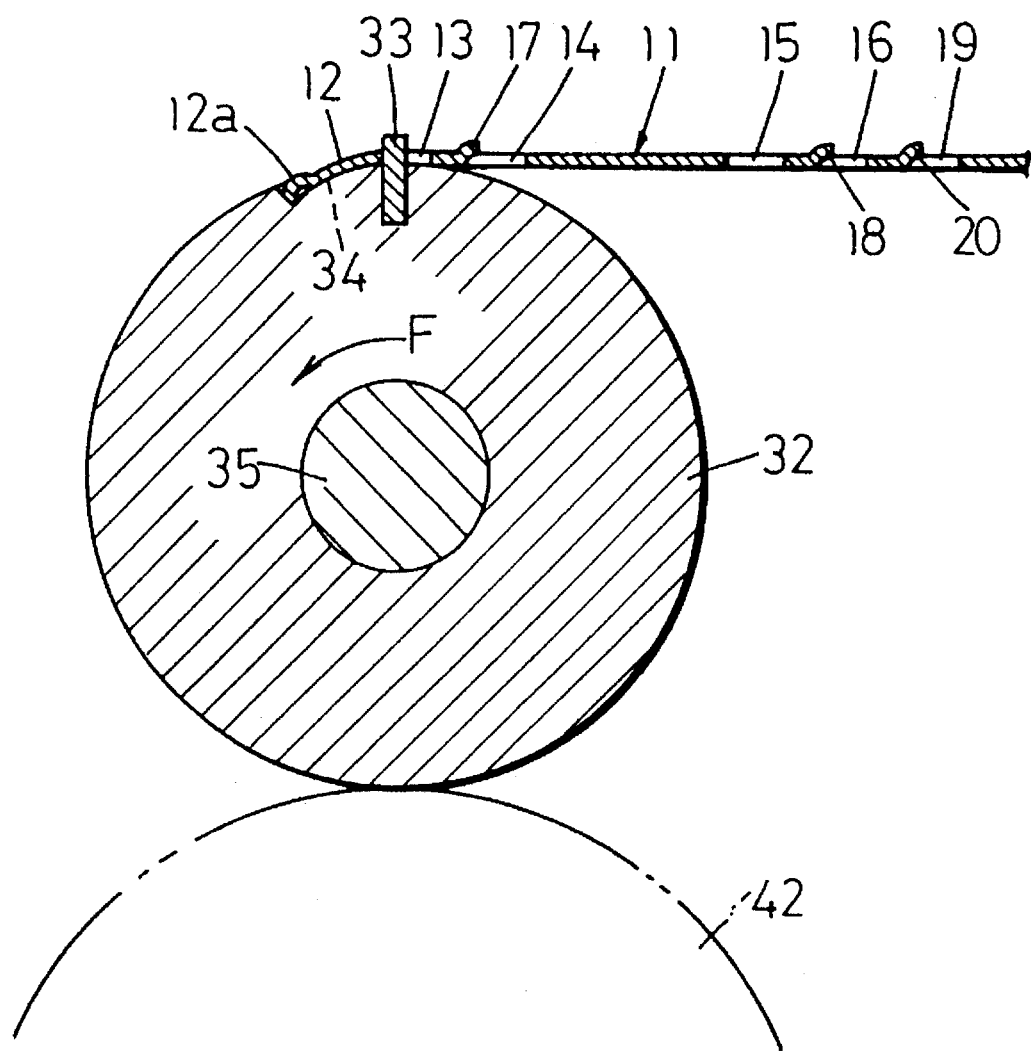
FIG. 18 is a sectional view taken along the line 18—18 in FIG. 17.

The metal strip material M subjected to the punching operation is then passed through a bending-up die for bending-up operation to form the first through fourth concave channel walls 17, 18, 20 and 25, the first and second concave channel walls 24 and 26, the pilot element 12a of the nose 12, and the prop key 27 in the clamp band 11. The manner of operation is as shown in FIGS. 13 and 14. In that case, whereas the first through fourth channel walls 17, 18, 20 and 25 and the pilot element 12a of the nose 12 are outwardly bulged, the first and second concave channel walls 24 and 26 and the prop key 27 are, of course, oppositely or inwardly bulged. In addition, the character A in FIGS. 10 through 14 suggests the necessary sizes of the punching die and bending-up die.

Thereafter, the metal strip material M is severed at positions C—C shown in FIGS. 10 through 14 into required lengths L to provide clamp bands 11, and finally each clamp band is bent up between the common receiving hole 21 and the second operating tool receiving hole 22 by an unillustrated bending-up die so as to form the outwardly bulged elastic hump 28.

Figure 3:
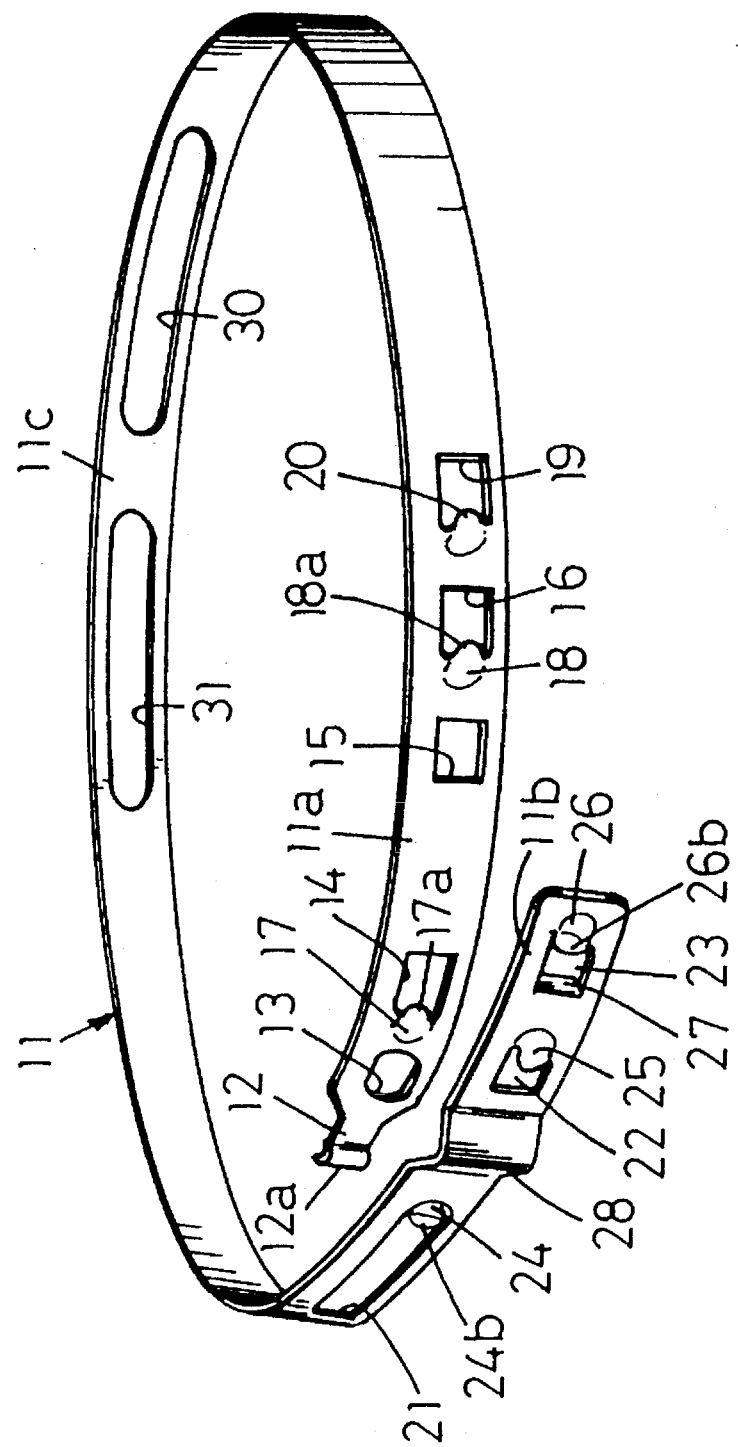
FIG. 3 is a perspective view of a clamping device wound in three-dimensional form as a complete product.
Figure 4:
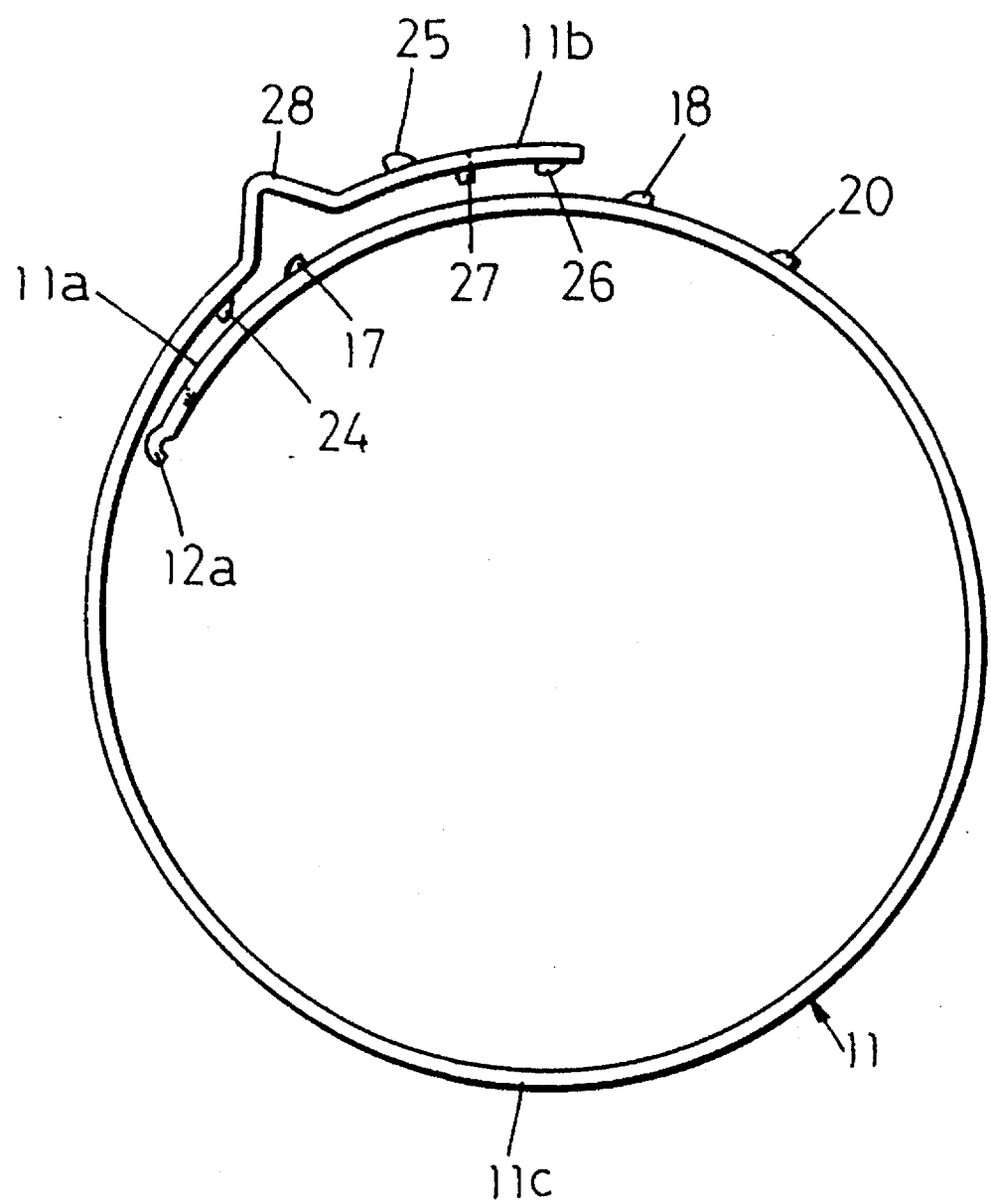
FIG. 4 is a front view of a product with a clamping device wound for three-dimensionalization.
Figure 5:
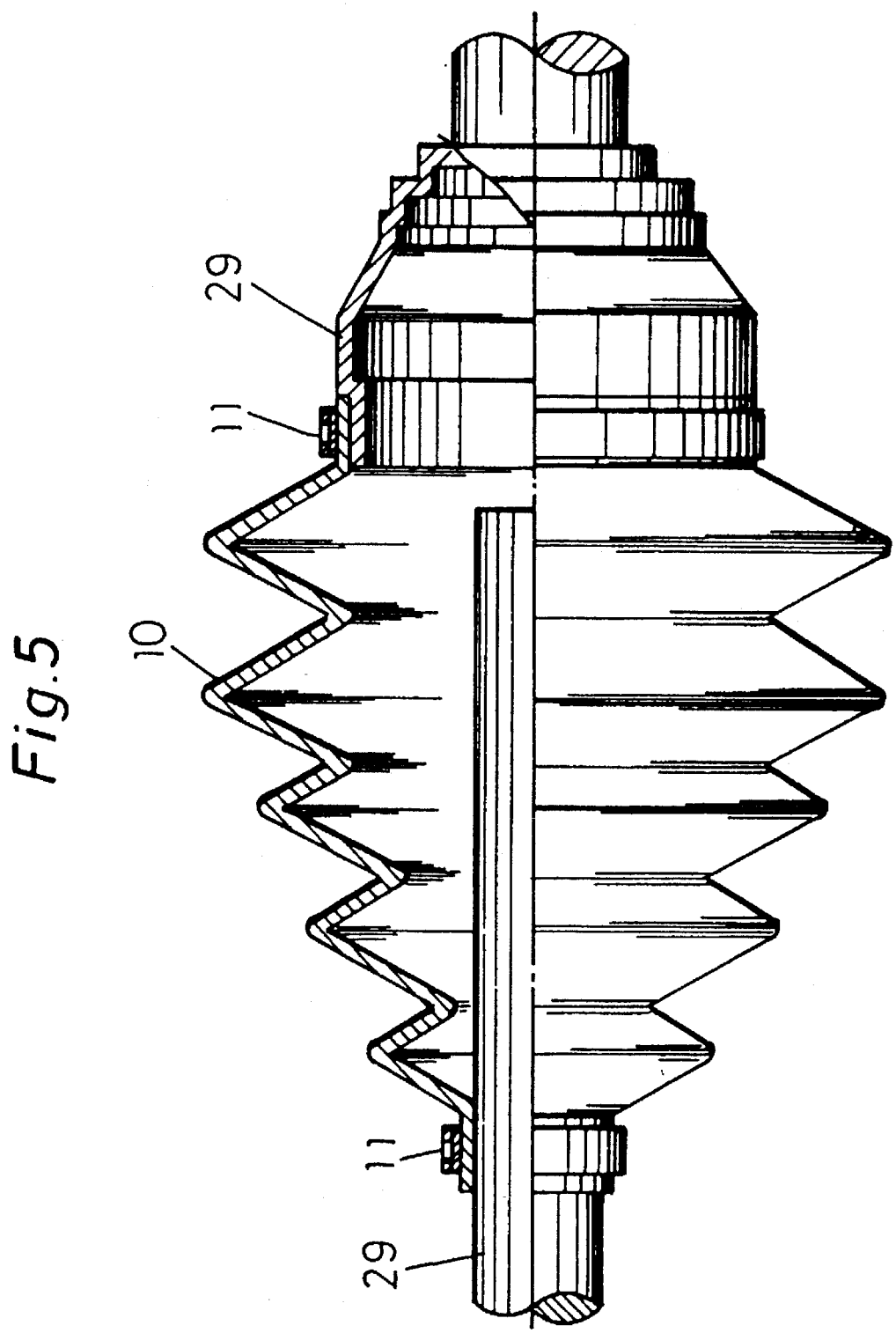
FIG. 5 is a view, partly in section, showing the tightened state in use of the clamping device for tightening a part to be fixed.
Figure 6:
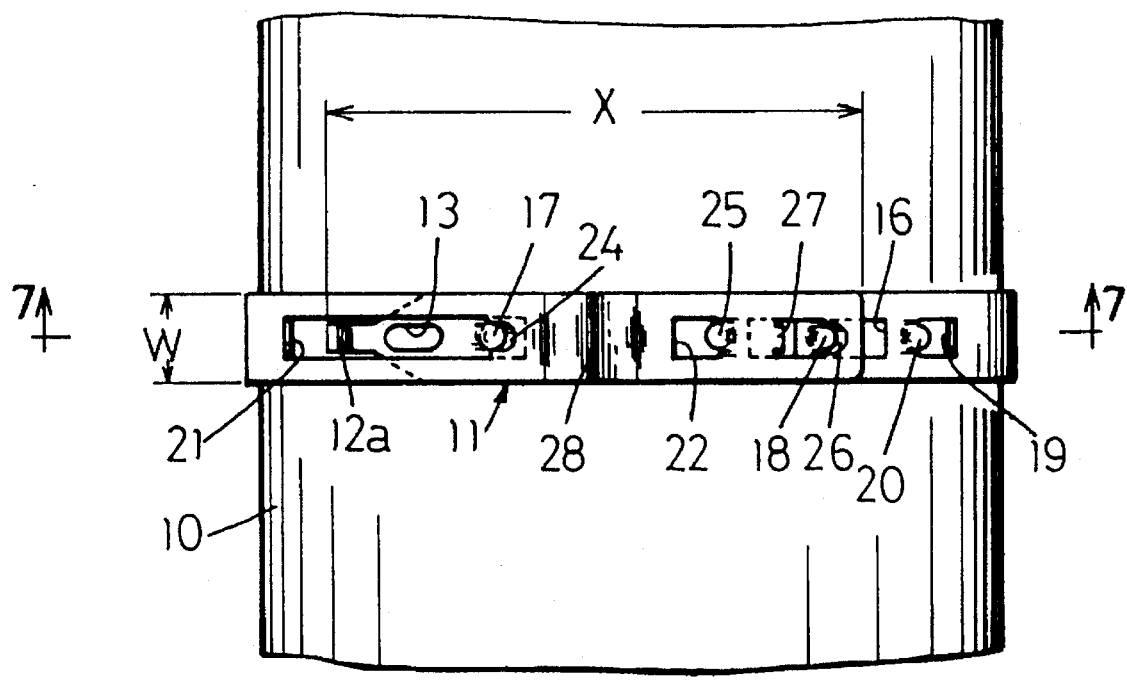
FIG. 6 is a partial enlarged plan view of FIG. 5.
Figure 7:
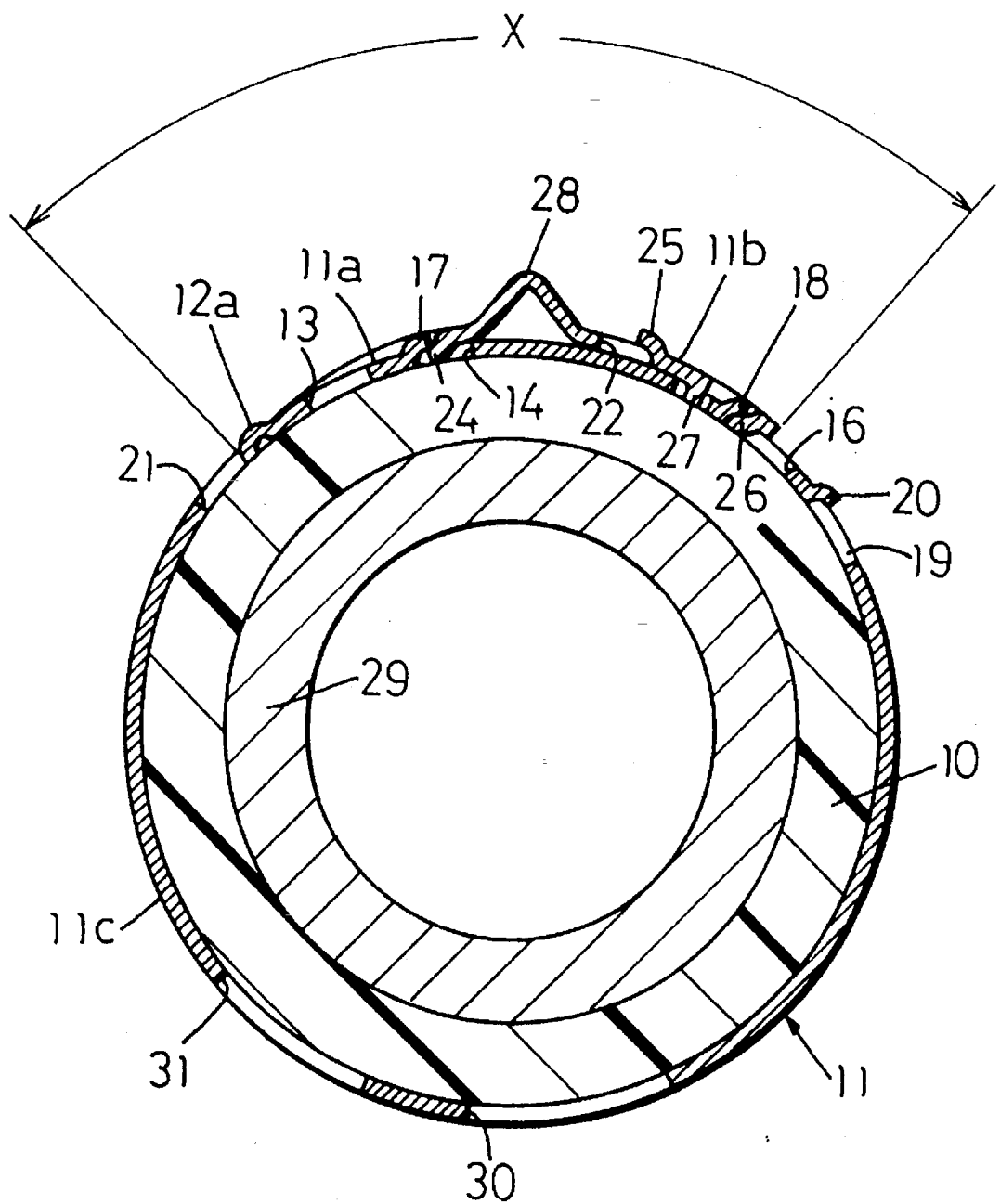
FIG. 7 is a sectional view taken along the line 7—7 in FIG. 6.

Each of the clamp bands 11 thus processed but still in planar form is fed from the transfer line to a bending-up forming machine, where it is roll-bent for three-dimensionalization in circular ring form in which the outer and inner overlap portions 11b and 11a overlap each other by a fixed amount X, thus providing a finished product as shown in FIGS. 3 and 4. When the product is removed from the forming machine, the clamp band 11 will spring back; therefore, it has to be roll-bent to have a smaller bore diameter than that of the finished product by an amount corresponding to the amount of spring-back.

For this purpose, the roll-bending formation lock pin receiving hole 13 and the first and second relief holes 30 and 31 are used in the following manner.

FIGS. 15 through 19 show the forming machine and the roll-bending operation on the clamp band 11 using the same. A locking pin 33 erected integrally on the circumferential surface of a roll-bending forming mandrel roll 32 which is smaller in diameter than the finished clamping device is inserted in the locking pin receiving hole 13 in the inner overlap portion 11a of the clamp band 11. The numeral 34 denotes a relief groove which is cut in the circumferential surface of the mandrel roll 32 for receiving therein the one cut end thus locked of the clamp band such that it sinks below the circumferential surface of the mandrel roll 32.

Figure 19:
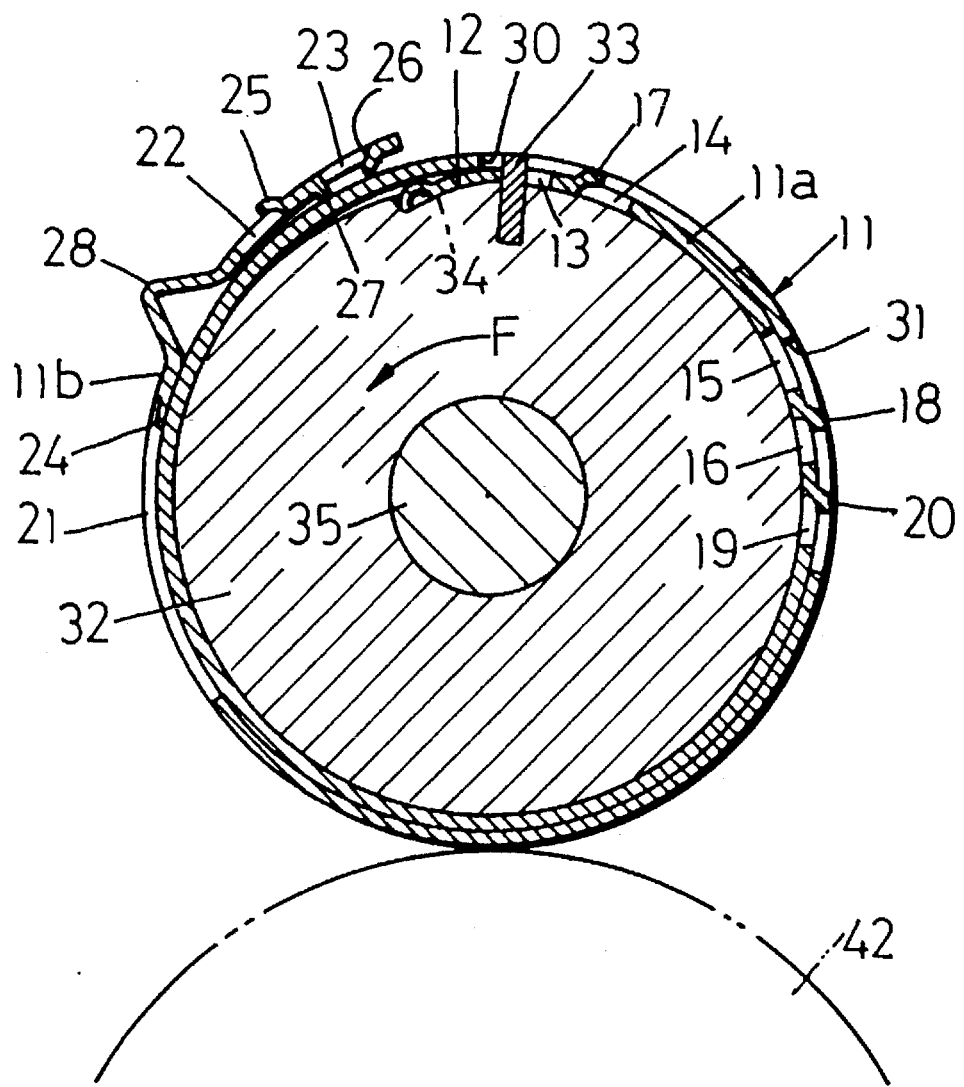
FIG. 19 is a sectional view corresponding to FIG. 18, showing the roll-bending operation on the clamping device.

The mandrel roll 32 is driven for rotation to draw the clamp band 11 to wind it around the circumferential surface of the mandrel roll 32 in two intimately contacted turns as shown in FIG. 19. In this case, in order to keep the clamp band in this smooth double wound contacted state, the locking pin 33 of the mandrel roll 32 and the first convex channel wall 17 of the clamp band 11 are inserted for relief in the first relief hole 30 in the intermediate portion 11c of the clamp band 11, while the second and third convex channel walls 18 and 20 of the clamp band 11 are received for relief in the second relief hole 31.

To establish the corresponding positional relation allowing such a correct relief reception, the first and second roll-bending formation relief holes 30 and 31 are distributively formed in the intermediate portion 11c of the clamp band 11. The clamp band 11 wound around the mandrel roll 32 in this intimately double contacted state is then removed from the mandrel roll 32, whereupon it springs back by the estimated amount; in this manner, the clamp band is finished as a clamping device as shown in FIGS. 3 and 4.

The numeral 35 in FIGS. 15 through 19 denotes a mandrel roll shaft supported in a fixed frame 36, and 37 denotes a pinion gear shaft supported in the fixed frame 36 in parallel relation to the mandrel roll shaft 35, said pinion gear shaft 37 carrying a pinion gear 38 thereon meshing with a rack gear 39 supported for reciprocating motion.

A large-diameter driving gear 40 supported on the pinion gear shaft 37 meshes with a small-diameter driven gear 41 supported on the mandrel roll shaft 35, so that when the rack gear 39 is moved, the mandrel roll 32 is rotated in the direction of arrow F in FIGS. 15 through 19.

The numeral 42 denotes a clamp band keep roll supported in a movable frame 43 movable under control toward and away from the mandrel roll 32, the circumferential surface of the keep roll being made of cushion material, such as urethane rubber, the keep roll being rotated together with the mandrel roll 32 and the clamp band 11 wound thereon.

More particularly, the clamp band 11 wound around the mandrel roll 32 is elastically pressed by the circumferential surface of the keep roll 42, so that even if the clamp band 11 has the fourth channel walls 25 and elastic hump 28 bulged outwardly therefrom, the clamp band 11 can be roll-bent without any trouble. The clamp band 11 can be removed or released from the mandrel roll 82 by moving the keep roll 42 away from the mandrel roll 32.

The clamping device of the present invention finished as a product shown in FIGS. 3 and 4 is of the open type. Therefore, when a part to be fixed 10, such as a fluid conveying hose, dustproof bellows, shaft boot or the like made of plastic material, such as rubber or synthetic resin is to be fixed on the connecting circumferential surface of a desired mating part 29 by using the clamp band 11, the clamp band 11 is once wrapped around the connecting circumferential surface of the part 10 from the diametrical direction in such a manner that it will not slip off.

Figure 20:
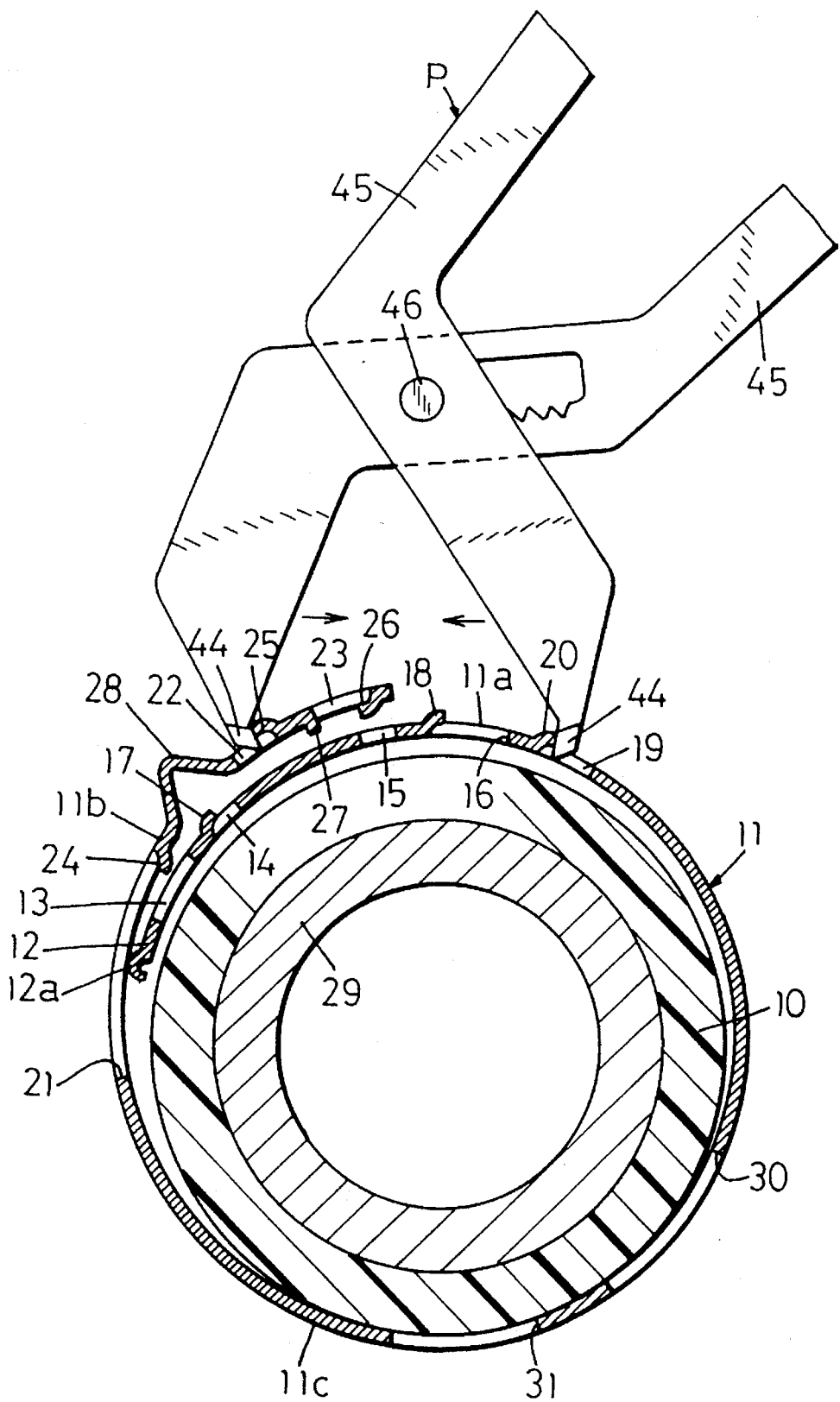
FIG. 20 is a front view showing the clamping device wrapped around a part to be fixed and also showing a draw operating type tool applied thereto.

In this wrapped state, the inner and outer overlap portions 11a and 11b of the clamp band 11 temporarily overlap each other. Thus, the pair of active teeth 44 provided at the front end of the draw type operating tool P are engaged with the fourth convex channel wall 25 of the second operating tool receiving hole 22 in the outer overlap portion 11b and the third convex channel wall 20 of the first operating tool receiving hole 19 in the inner overlap portion 11a, as suggested from FIG. 20.

Figure 21:
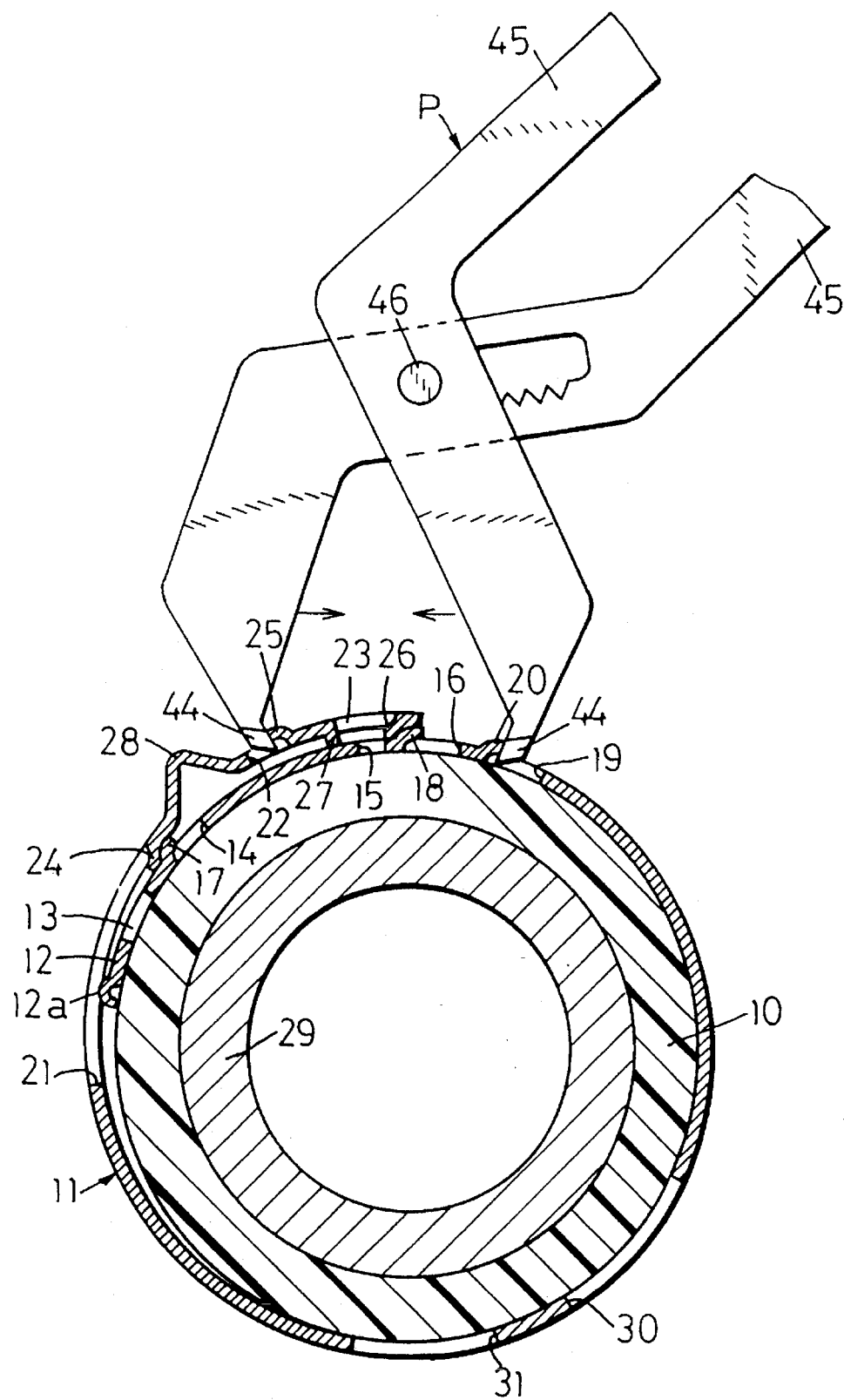
FIGS. 21 and 22 are front views corresponding to FIG. 20, showing the phases of the draw operation on the clamping device.
Figure 22:
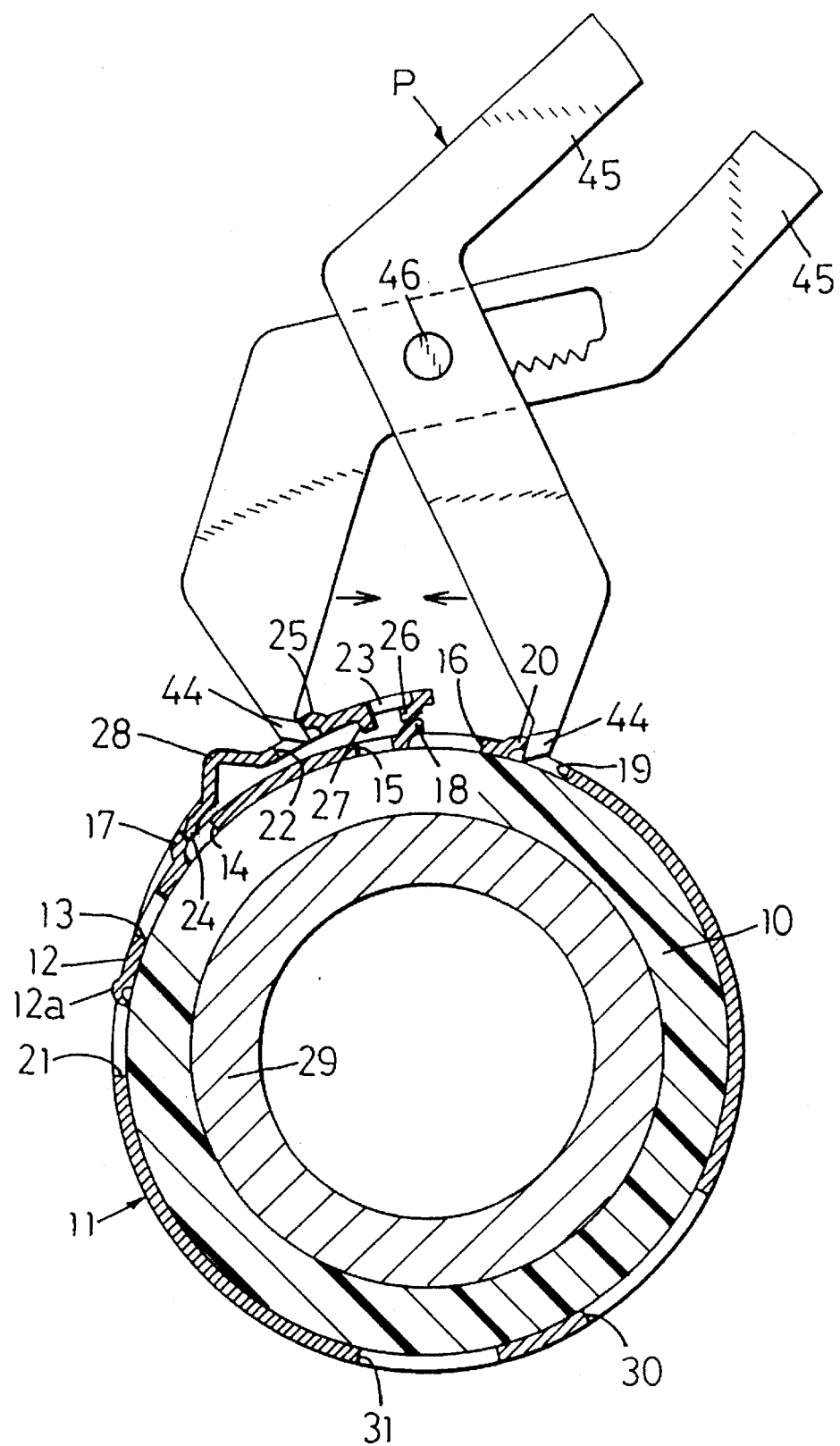
Figure 23:
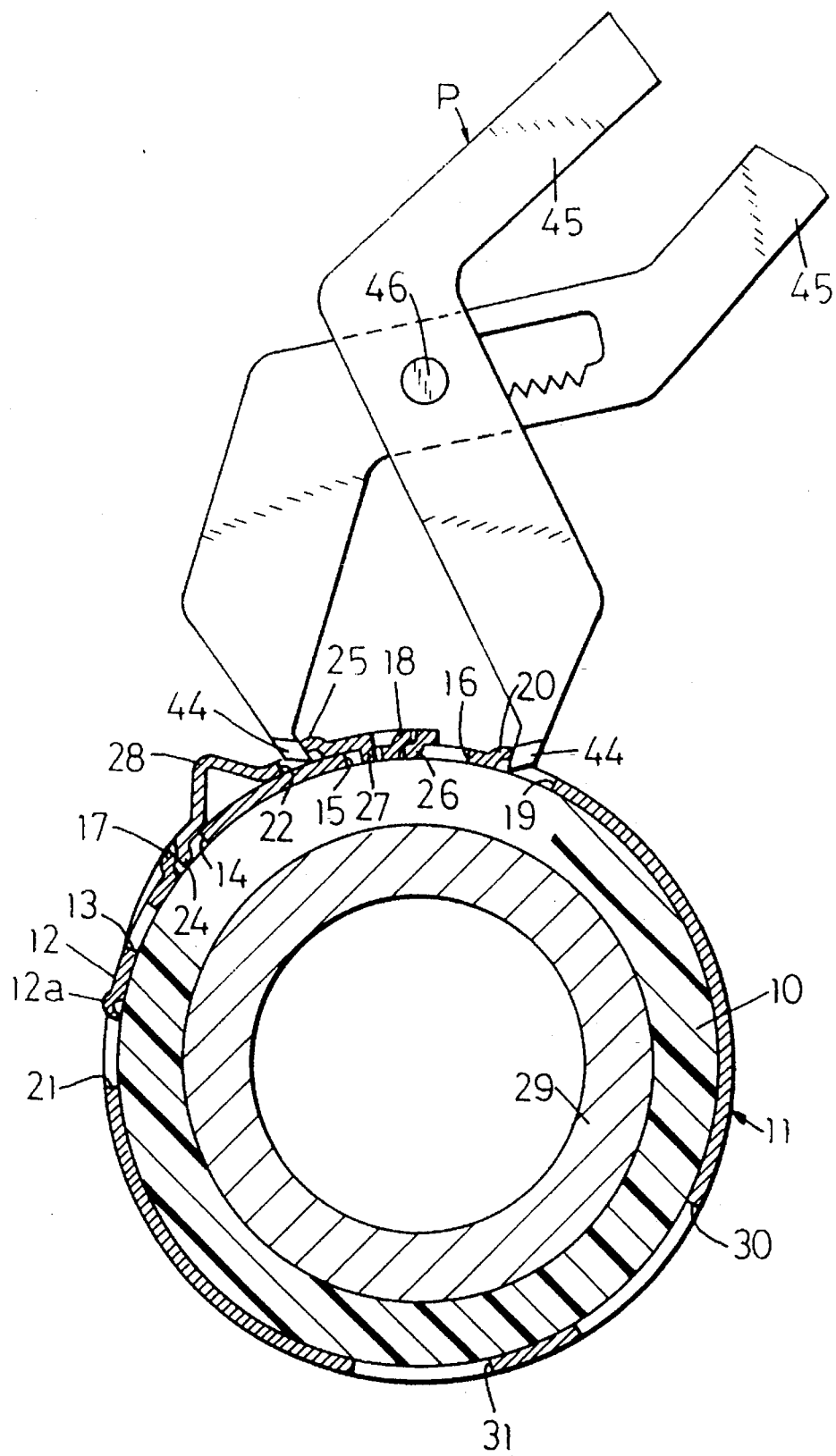
FIG. 23 is a front view showing the locked state of the clamping device upon completion of the draw operation.

The operator strongly grips the pair of handles 45 of the operating tool P to draw the pair of active teeth 44 toward each other around an assembling pivot 44, whereby the bore diameter of the clamp band 11 is forcibly contracted, during which operation, as suggested from FIGS. 21 and 22, the nose 12 forming one cut end of the inner overlap portion 11a, particularly its pilot element 12a, enters the common receiving hole 21 of the outer overlap portion 11b, thereby maintaining the correct overlap state free from transverse deviation.

As the above draw operation continues, the first concave channel wall 24 of the outer overlap portion 11b and the first convex channel wall 17 of the inner overlap portion 11a move across each other, and second concave channel wall 26 at th cut end of the outer overlap portion 11b and the second convex channel wall 18 of the inner overlap portion 11a also move across each other, with the prop key 27 of the outer overlap portion 11b sinks in the prop key receiving hole 15 in the inner overlap portion 11a. Finally, the seizing tooth 18a of the inner overlap portion 11a and the fixed tooth 26b of the outer overlap portion 11b seizingly engage each other, with the result that the part 10 is integrally tightly fixed on the connecting circumferential surface of the desired mating device 29. Thereafter, the active teeth 44 of the operating tool P are extracted outwardly of the clamp band 11, of course.

If an excessive load which, though not causing disruption of the locked location where the fastening seizing tooth 18a and the fixed tooth 26b seizingly engage each other, exceeds the elastic limit acts on the elastic hump 28 during draw operation or use of the clamp band 11, the resulting abnormal stretch deformation of the elastic hump 28 would lead to the danger of the clamp band 11 becoming loose as it springs back. In such case, however, the preparatory seizing tooth 17a and preparatory fixed tooth 24b, which are positioned to bear such load, automatically come into seizure engagement with each other; thus, the loosening of the clamp band 11 is reliably prevented.

At this time, at two locations with the elastic hump 28 interposed therebetween, the clamp band 11 is tightened in the overlap locked state in which the seizing teeth 17a and 18a and the fixed teeth 24b and 26b are in seizure engagement with each other; therefore, the prop key 27 and the receiving hole therefor for preventing separation of the clamp band 11 may be omitted. This is because even if the prop key 27 is absent, the situation is quite the same and the danger of the clamp band 11 being loosened is prevented by the seizure engaging action of the preparatory fixed tooth and preparatory seizing tooth.

Further, the first and second convex channel walls 17 and 18 of the inner overlap portion 11a are outwardly bulged by an amount substantially equal to the thickness T of the metal strip material M, while the first and second concave channel walls 24 and 26 of the outer overlap portion 11b are reversely or inwardly bulged by an amount substantially equal to the thickness T of the metal strip material M. Therefore, the seizing teeth 17a and 18a and the fixed teeth 24b and 26b seizingly engage each other in the plane of overlap between the inner and outer overlap portions 11a and 11b, with the result that the pilot element 12a of the nose 12 and the first convex channel wall 17 which are outwardly bulged from the inner overlap portion 11a are received in the common receiving hole 21 in the outer overlap portion 11b, and the clamp band 11 can be maintained extremely flat. Besides this, the turn-back in the direction of separation between the seizing teeth 17a and 18a and the fixed teeth 24b and 26b can be effectively prevented.

Furthermore, the second concave channel wall 26 is formed on the other cut end of the outer overlap portion 11b and the fixed tooth 25b is adapted to seizingly engage the seizing tooth 18a; therefore, there is no danger of the outer overlap portion 11b accidentally turning up from the cut end.

Further, active teeth 44 of the operating tool P engage both the third convex channel wall 20 forming the opening edge of the first operating tool receiving hole 19 and the fourth convex channel wall 25 forming the opening edge of the second operating tool receiving hole 22, and since both the third and fourth convex channel walls 20 and 25 are outwardly bulged, the draw operating force exerted by the active teeth 44 can be stably supported with the increased resisting strength.

As described above, in the present invention, even if an excessive load exceeding the elastic limit acts on the elastic hump 28 to produce a deforming force tending to stretch the elastic hump to the yield point during draw operation or use of the clamp band 11, such stretch deforming force on the elastic hump 28 can be resisted by the seizure engagement between the preparatory seizing tooth 17a and the preparatory fixed tooth 24b, which engagement, with the elastic hump taken to be a boundary, takes place at a position reverse to the locked location where the seizing tooth 18a of the inner overlap portion 11a and the fixed tooth 26b of the outer overlap portion 11b seizingly engage each other, and the danger of the clamp band 11 being loosened can be reliably prevented. Such an effect can be equally attained irrespective of whether the prop key 27 propping the seizing tooth 18a of the inner overlap portion 11a from behind is inwardly bulged to prevent the unlocking between the seizing tooth 18a and the fixed tooth 24b of the outer overlap portion 11b or such prop key 27 is omitted.

Further, in the present invention, the nose 12 forming one cut end of the inner overlap portion 11a of the clamp band 11 is bulged in outwardly convex form to serve as a pilot element 12a; therefore, when the inner and outer overlap portions 11a and 11b of the clamp band 11 are roll-bent in annular form for three-dimensionalization, the pilot element 12a quickly enters the receiving hole 21 in the outer overlap portion 11b, literally functioning as a pilot to eliminate the danger of the inner and outer overlap portions 11a and 11b transversely deviating; thus, they can be automatically maintained in the overlap state, having an additional effect that the sizing tooth 18a and the fixed tooth 24b instantaneously come into correct seizure engagement with each other.

What is claimed is:

1. A draw operating type clamping device comprising a clamp band (11) of a metal strip material (M) is cut to a fixed length (L), said clamp band (11) being wound in a circular ring for three-dimensionalization such that an inner overlap portion (11a) terminating in one roll-bent end and an outer overlap portion (11b) terminating in the other end overlap each other by a fixed amount (X), A cut end along the inner overlap portion (11a) is notched to form a nose (12) having a fixed width (W1) narrower than a width (W) of the metal strip material (M), said inner overlap portion (11a) is formed with a second concave channel wall receiving hole (16), and an intermediate portion (11c) where the clamp band (11) does not overlap is formed with a first operating tool receiving hole (19) disposed adjacent said second concave channel wall receiving hole (16), an opening edge of the first operating tool receiving hole (19) disposed adjacent said second concave channel wall receiving hole (16) is outwardly bulged to form an operating tool support-purpose third convex channel wall (20), an opening edge of said second concave channel wall receiving hole (16) disposed on a side associated with the nose (12) is outwardly bulged to form a second convex channel wall (18), a portion of the middle of said second convex channel wall (18) extending toward an interior of said second concave channel wall receiving hole (16) form a seizing tooth (18a), said outer overlap portion (11b) is formed with a receiving hole (23) for said second convex channel wall (18), a second operating tool receiving hole (22) juxtaposed with said first operating tool receiving hole (19), and a common receiving hole (21) for jointly receiving said nose (12) and a first convex channel wall (17), an opening edge of said second convex channel wall receiving hole (23) disposed on a cut end side is inwardly bulged to form a second concave channel wall (26) opposed to said second convex channel wall (18), a middle portion of said second concave channel wall (26) extending toward an interior of said second convex channel wall receiving hole (23) to serve as a fixed tooth (26b) capable of seizingly engaging said seizing tooth (18a), an opening edge of said second operating tool receiving hole (22) on a cut end is outwardly bulged to serve as an operating tool support-purpose fourth convex channel wall (25) opposed to said third convex channel wall (20), an elastic hump (28) for storing spring force circumferentially of the clamp band (11) is outwardly bulged between the second operating tool receiving hole (22) and the common receiving hole (21), an arrangement being such that a pair of active teeth (44) of a draw type operating tool (P) are respectively adapted to engage with the third convex channel wall (20) of the first operating tool receiving hole (19) in said inner overlap portion (11a) and the fourth convex channel wall (25) of the second operating tool receiving hole (22) in said outer overlap portion (11b) and the operating tool (P) is manipulated to draw said pair of active teeth (44) toward each other to forcibly deform a diameter of said clamp band (11) for contraction, whereupon the seizing tooth (18a) of the inner overlap portion (11a) and the fixed tooth (26b) of the outer overlap portion (11b) seizingly engage each other, an opening edge of the common receiving hole (21) of the outer overlap portion (11b) disposed adjacent the elastic hump (28) is inwardly bulged to serve as a first concave channel wall (24), a middle portion of said first concave channel wall (24) extending toward an interior of said common receiving hole (21) to form a preparatory fixed tooth (24b), a receiving hole (14) for said first concave channel wall (24) is formed between the nose (12) of said inner overlap portion (11a) and the second convex channel wall (18), and an opening edge of said receiving hole

(14) disposed adjacent the nose (12) is outwardly bulged to form said first convex channel wall (17), a middle portion of said first convex channel wall (17) extending toward an interior of said wall receiving hole (14) to form a preparatory seizing tooth (17a) capable of seizingly engaging said preparatory fixed tooth (24b), an arrangement being such that when an excessive stretch deforming force exceeding an elastic limit acts on the elastic hump (28), the preparatory fixed tooth (24b) of the outer overlap portion (11b) and the preparatory seizing tooth (17a) of the inner overlap portion (11a) seizingly engage each other, thereby preventing loosening of the clamp band (11).

2. A draw operating type clamping device comprising a clamp band (11) of a metal strip material (M) is cut to a fixed length (L), said clamp band (11) being wound in a circular ring for three-dimensionalization such that an inner overlap portion (11a) terminating in one roll-bent end and an outer overlap portion (11b) terminating in the other end overlap each other by a fixed amount (X), a cut end along the inner overlap portion (11a) is notched to form a nose (12) having a fixed width (W1) narrower than a width (W) of the metal strip material (M), said inner overlap portion (11a) is formed with a second concave channel wall receiving hole (16), a prop key receiving hole (15) and a second concave channel wall receiving hole (16) respectively positioned from the nose (12) toward a side of said intermediate portion (11c) where the clamp band (11) does not overlap, and the intermediate portion (11c) where the clamp band (11) does not overlap is formed with a first operating tool receiving hole (19) disposed adjacent said second concave channel wall receiving hole (16), an opening edge of the first operating tool receiving hole (19) disposed adjacent said second concave channel wall receiving hole (16) is outwardly bulged to form an operating tool support-purpose third convex channel wall (20), an opening edge of said second concave channel wall receiving hole (16) disposed adjacent the prop key receiving hole (15) is outwardly bulged to form a second convex channel wall (18), a middle portion of said second convex channel wall (18) extending toward an interior of said second concave channel wall receiving hole (16) to form a seizing tooth (18a), said outer overlap portion (11b) is formed with a receiving hole (23) for said second convex channel wall (18), a second operating tool receiving hole (22) juxtaposed with said first operating tool receiving hole (19), and a common receiving hole (21) for jointly receiving a said nose (12) and a said first convex channel wall (17), an opening edge of said second convex channel wall receiving hole (23) disposed on a cut end side is inwardly bulged to form a second concave channel wall (26) opposed to said second convex channel wall (18), a middle portion of said second concave channel wall (26) extending toward an interior of said second convex channel wall receiving hole (23) to serve as a fixed tooth (26b) capable of seizingly engaging said seizing tooth (18a), an opening edge of said first convex channel wall receiving hole (23) opposed to said fixed tooth has a prop key (27) extending therefrom and bent, said prop key being capable of sinking in the prop key receiving hole (15) through the second convex channel wall receiving hole (23), an opening edge of said second operating tool receiving hole (22) on a cut end is outwardly bulged to serve as an operating tool support-purpose fourth convex-channel wall (25) opposed to a third convex channel wall (20), an elastic hump (28) for storing spring force circumferentially of the clamp band (11) is outwardly bulged between the second operating tool receiving hole (22) and the common receiving hole (21), an arrangement being such that the a pair of active teeth (44) of a draw type operating tool (P) are respectively adapted to engage with the third convex channel wall (20) of the first operating tool receiving hole (19) in said inner overlap portion (11a) and the fourth convex channel wall (25) of the second operating tool receiving hole (22) in said outer overlap portion (11b) and the operating tool (P) is manipulated to draw its pair of active teeth (44) toward each other to forcibly deform the bore diameter of said clamp band (11) for contraction, whereupon the seizing tooth (18a) of the inner overlap portion (11a) and the fixed tooth (26b) of the outer overlap portion (11b) seizingly engage each other, and such that when a disengaging force acts between the fixed tooth (26b) and the seizing tooth (18a), the prop key (27) of the outer overlap portion (11b) quickly engages the opening edge of the prop key receiving hole (15), the opening edge of the common receiving hole (21) of the outer overlap portion (11b) disposed adjacent the elastic hump (28) is inwardly bulged to serve as a first concave channel wall (24), a portion of the middle of said first concave channel wall (24) extending toward the interior of said common receiving hole (21) to form a preparatory fixed tooth (24b), and the opening edge of said first concave channel wall receiving hole (14) disposed adjacent the nose (12) is outwardly bulged to form said first convex channel wall (17), a middle portion of said first convex channel wall (17) extending toward an interior of a first concave channel wall receiving hole (14) to form a preparatory seizing tooth (17a) capable of seizingly engaging said preparatory fixed tooth (24b), an arrangement being such that when an excessive stretch deforming force exceeding an elastic limit acts on the elastic hump (28), the preparatory fixed tooth (24b) of the outer overlap portion (11b) and the preparatory seizing tooth (17a) of the inner overlap portion (11a) seizingly engage each other, thereby preventing loosening of the clamp band (11).

3. A draw operating type clamping device as set forth in claim 1 or 2, wherein the front end of the nose (12) is outwardly bulged from the inner overlap portion (11a) of the clamp band (11) by an amount substantially equal to a thickness (T) of the metal strip material (M) to serve as a longitudinal sliding pilot element (12a) in a convex form.

\* \* \* \* \*